United States Patent
Onishi

(10) Patent No.: US 9,800,155 B2
(45) Date of Patent: Oct. 24, 2017

(54) DC-DC CONVERTER

(71) Applicant: DENSO CORPORATION, Kariya, Aichi-pref. (JP)

(72) Inventor: Masanori Onishi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/314,988

(22) PCT Filed: Dec. 8, 2015

(86) PCT No.: PCT/JP2015/006102
§ 371 (c)(1),
(2) Date: Nov. 30, 2016

(87) PCT Pub. No.: WO2016/098312
PCT Pub. Date: Jun. 23, 2016

(65) Prior Publication Data
US 2017/0201176 A1 Jul. 13, 2017

(30) Foreign Application Priority Data
Dec. 15, 2014 (JP) .................................. 2014-253386

(51) Int. Cl.
G05F 1/24 (2006.01)
G05F 1/573 (2006.01)
(Continued)

(52) U.S. Cl.
CPC ............. H02M 3/158 (2013.01); H02M 1/08 (2013.01); *H02M 2001/0009* (2013.01)

(58) Field of Classification Search
CPC ....... G05F 1/569; G05F 1/575; H02M 3/1582
(Continued)

(56) References Cited

U.S. PATENT DOCUMENTS

2005/0218876 A1* 10/2005 Nino .................... H02M 3/1582
323/282
2008/0079405 A1* 4/2008 Shimizu .............. H02M 1/4208
323/282

(Continued)

FOREIGN PATENT DOCUMENTS

JP 62-018970 A 1/1987
JP 2003-125576 A 4/2003
(Continued)

Primary Examiner — Adolf Berhane
Assistant Examiner — Gary Nash
(74) Attorney, Agent, or Firm — Posz Law Group, PLC

(57) ABSTRACT

A DC-DC converter includes a control unit. When switching from an increasing operation to a first operation, the control unit increases an on time in the increasing switch at a beginning of the first operation longer than an end of the increasing operation. When switching from the first operation to the increasing operation, the control unit decreases the on time in the increasing switch at a beginning of the increasing operation shorter than an end of the first operation. When switching from the second operation to the decreasing operation, the control unit decreases an off time in the decreasing switch at a beginning of the decreasing operation shorter than an end of the second operation. When switching from the decreasing operation to the second operation, the control unit increases the off time in the decreasing switch at a beginning of the second operation longer than an end of the decreasing operation.

7 Claims, 15 Drawing Sheets

(51) Int. Cl.
*G05F 1/00* (2006.01)
*H02M 1/00* (2006.01)
*H02M 7/00* (2006.01)
*H02M 3/158* (2006.01)
*H02M 1/08* (2006.01)

(58) Field of Classification Search
USPC ........ 323/241–243, 259, 273–277, 282–284; 363/78, 124
See application file for complete search history.

(56) References Cited

U.S. PATENT DOCUMENTS

| | | | | |
|---|---|---|---|---|
| 2009/0039841 | A1* | 2/2009 | Fabbro | H02M 3/1582 323/271 |
| 2010/0164650 | A1* | 7/2010 | Abou-Alfotouh | H03H 7/0115 333/181 |
| 2010/0320992 | A1* | 12/2010 | Dearn | H02M 3/1582 323/311 |
| 2012/0105038 | A1* | 5/2012 | Chen | H02M 3/1582 323/283 |
| 2012/0126624 | A1* | 5/2012 | Hester | G05F 1/67 307/77 |

FOREIGN PATENT DOCUMENTS

| | | |
|---|---|---|
| JP | 2009-124844 A | 6/2009 |
| JP | 2011-229210 A | 11/2011 |

* cited by examiner

DC-DC CONVERTER

CROSS REFERENCE TO RELATED APPLICATIONS

This application is the U.S. national stage of International Patent Application No. PCT/JP2015/006102 filed on Dec. 8, 2015 and is based on Japanese Patent Application No. 2014-253386 filed on Dec. 15, 2014, the disclosure of which is incorporated herein by reference.

TECHNICAL FIELD

The present disclosure relates to a DC-DC converter that increases or decreases an input voltage to generate an output voltage at a constant voltage level.

BACKGROUND ART

As described in Patent Literature 1, a known type of step-up/down DC-DC converter keeps the output voltage constant irrespective of variation in input voltage. Such a step-up/down DC-DC converter includes a voltage decreasing switch and a voltage increasing switch. In a voltage decreasing mode, the voltage decreasing switch is switched while the voltage increasing switch is kept off. In a voltage increasing mode, the voltage decreasing switch is kept on while the voltage increasing switch is switched. In a voltage increasing/decreasing mode, the voltage decreasing switch and the voltage increasing switch are switched alternately.

The step-up/down DC-DC converter described above gradually reduces the number of times that the voltage decreasing switch is switched in the changeover from the voltage decreasing mode to the voltage increasing/decreasing mode. It gradually increases the number of times that the voltage decreasing switch is switched in the changeover from the voltage increasing/decreasing mode to the voltage decreasing mode. Similarly, the step-up/down DC-DC converter gradually reduces the number of times that the voltage increasing switch is switched in the changeover from the voltage increasing mode to the voltage increasing/decreasing mode. It gradually increases the number of times that the voltage increasing switch is switched in the changeover from the voltage increasing/decreasing mode to the voltage increasing mode. In this manner, the step-up/down DC-DC converter changes switching operations of the voltage decreasing switch and the voltage increasing switch smoothly when the modes are changed, so that the output voltage is kept constant.

As described above, the step-up/down DC-DC converter described in Patent Literature 1 gradually reduces or increases the number of times that the voltage decreasing switch or the voltage increasing switch is switched in a mode changeover. Although this method allows the step-up/down DC-DC converter to keep the output voltage constant, the method poses a problem that the frequency band of noise generated by the switching increases.

PRIOR ART LITERATURES

Patent Literature

Patent Literature 1: JP-2011-229210-A

SUMMARY OF INVENTION

It is an object of the present disclosure to provide a DC-DC converter that keeps an output voltage constant and inhibits noise from increasing its frequency band.

According to a first aspect of the present disclosure, a DC-DC converter that increases or decreases an input voltage supplied from an input power source (200), and generates an output voltage having a constant voltage level, the DC-DC converter includes: a coil; a voltage decreasing switch that is disposed between the input power source and one end of the coil; a first output terminal that outputs the output voltage, and a second output terminal that has a potential fixed at a reference potential; a voltage increasing switch that is disposed between the second output terminal and the other end of the coil; and a control unit that keeps the output voltage at the constant voltage level irrespective of variation in the input voltage by controlling an on-state and an off state of each of the voltage decreasing switch and the voltage increasing switch. The control unit performs a voltage increasing operation for increasing the input voltage or a first voltage increasing and decreasing operation having a voltage increase amount of the input voltage smaller than the voltage increasing operation. The control unit performs a voltage decreasing operation for decreasing the input voltage or a second voltage increasing and decreasing operation having a voltage decrease amount of the input voltage smaller than the voltage decreasing operation. In the voltage increasing operation, the control unit always controls the voltage decreasing switch to be in the on-state, and controls the voltage increasing switch to switch periodically between the on-state and the off-state. In the voltage decreasing operation, the control unit controls the voltage decreasing switch to switch periodically between the on-state and the off-state, and always controls the voltage increasing switch to be in the of state. In each of the first voltage increasing and decreasing operation and the second voltage increasing and decreasing operation, the control unit controls the voltage decreasing switch and the voltage increasing switch to switch with a same period at a different duty ratio between the on-state and the off-state. When switching from the voltage increasing operation to the first voltage increasing and decreasing operation, the control unit increases an on-state time per one period in the voltage increasing switch at a beginning of the first voltage increasing and decreasing operation to be longer than an end of the voltage increasing operation so as to inhibit the output voltage from undershooting. When switching from the second voltage increasing and decreasing operation to the voltage decreasing operation, the control unit decreases an off-state time per one period in the voltage decreasing switch at a beginning of the voltage decreasing operation to be shorter than an end of the second voltage increasing and decreasing operation so as to inhibit the output voltage from undershooting. When switching from the voltage decreasing operation to the second voltage increasing and decreasing operation, the control unit increases the off-state time in the voltage decreasing switch at a beginning of the second voltage increasing and decreasing operation to be longer than an end of the voltage decreasing operation so as to inhibit the output voltage from overshooting. When switching from the first voltage increasing and decreasing operation to the voltage increasing operation, the control unit decreases the on-state time in the voltage increasing switch at a beginning of the voltage increasing operation to be shorter than an end of the first voltage increasing and decreasing operation so as to inhibit the output voltage from overshooting.

When the voltage increasing switch is controlled so as to be turned on and off with the voltage decreasing switch kept on, the input voltage is increased because of energy accumulated in the coil due to current flowing through the coil. The quantity of voltage increase grows as the on time of the voltage increasing switch is extended. When the voltage decreasing switch is controlled so as to be turned on and off with the voltage increasing switch kept off, the input voltage is decreased due to periods of time in which no current flows through the coil. The quantity of voltage decrease grows as the off time of the voltage decreasing switch is extended.

In the transition from the voltage increasing operation to the first voltage increasing/decreasing operation, the DC-DC converter described above extends the on time of the voltage increasing switch to increase the quantity of voltage increase temporarily. In the transition from the second voltage increasing/decreasing operation to the voltage decreasing operation, the DC-DC converter shortens the off time of the voltage decreasing switch to reduce the quantity of voltage decrease temporarily. This inhibits temporary reduction of the quantity of voltage increase and temporary increase of the quantity of voltage decrease in the changeovers of the operations, thereby inhibiting the output voltage from undershooting. In the transition from the voltage decreasing operation to the second voltage increasing/decreasing operation, the DC-DC converter extends the off time of the voltage decreasing switch to increase the quantity of voltage decrease temporarily. In the transition from the first voltage increasing/decreasing operation to the voltage increasing operation, the DC-DC converter shortens the on time of the voltage increasing switch to reduce the quantity of voltage increase temporarily. This inhibits temporary reduction of the quantity of voltage decrease and temporary increase of the quantity of voltage increase in the changeovers of the operations, thereby inhibiting the output voltage from overshooting.

As described above, the DC-DC converter adjusts the on time of the voltage increasing switch and the off time of the voltage decreasing switch in a changeover of the operations and thereby inhibits the output voltage from overshooting or undershooting. In this manner, the output voltage is kept constant. As described above, the on time and the off time of the switches are adjusted in a transition of the operations in the present disclosure. Therefore, in comparison with a configuration that adjusts the number of times that the switches are turned on (the number of times that they are switched) in a transition of operations, the configuration of the present disclosure inhibits noise, caused by switching of the switches, from increasing its frequency band.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
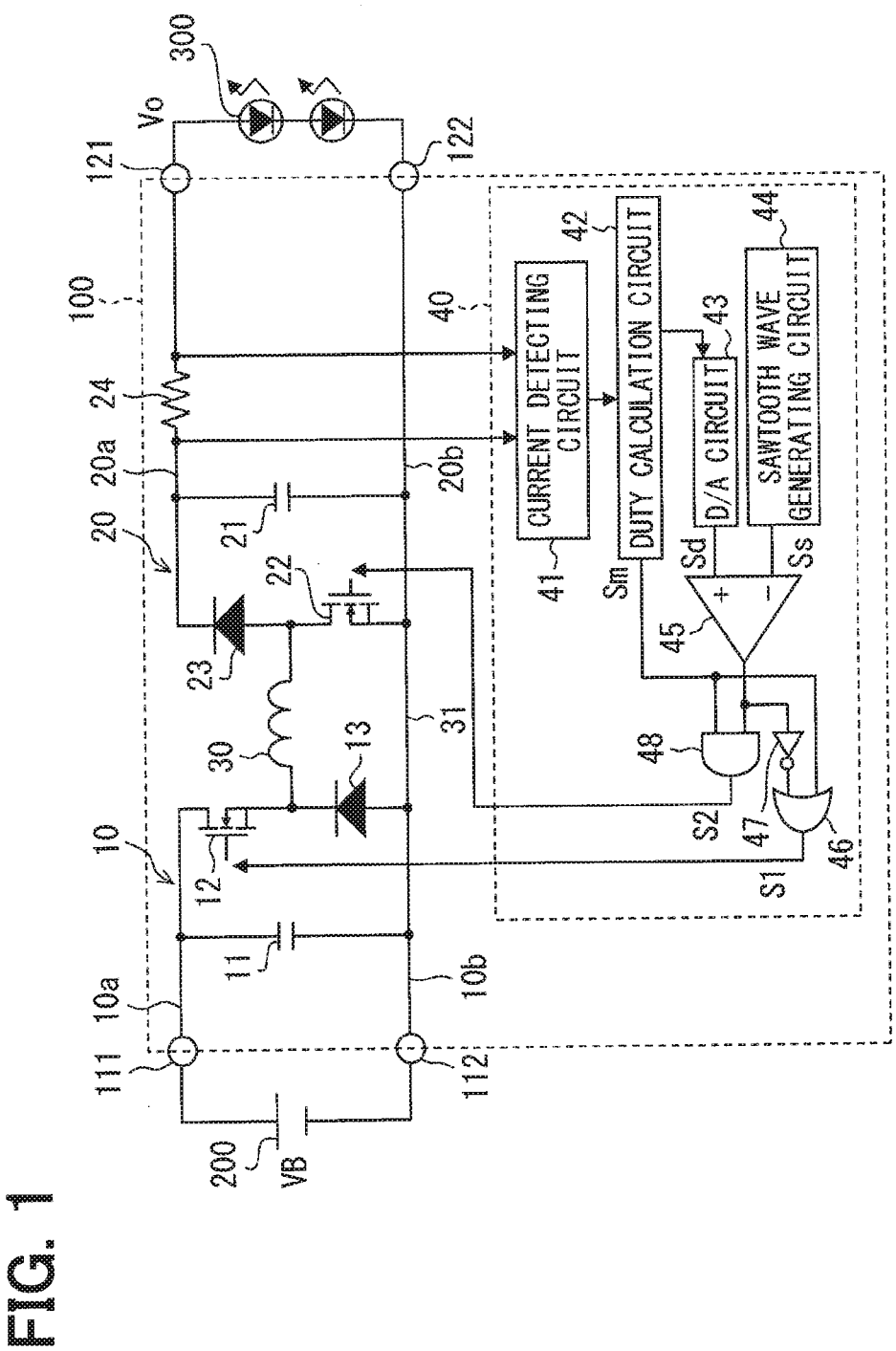
FIG. 1 is a circuit diagram of a schematic configuration of a DC-DC converter according to a first embodiment.

An embodiment of a DC-DC converter according to the present disclosure will now be described with reference to the drawing. In the embodiment, the DC-DC converter is used in lighting control of an LED for use in an in-vehicle headlamp or the like.

First Embodiment

A DC-DC converter according to the present embodiment will now be described with reference to FIGS. 1 to 13. As illustrated in FIG. 1, a DC-DC converter 100 includes a first input terminal 111 and a second input terminal 112, which are connected to an input power source 200. The DC-DC converter 100 also includes a first output terminal 121 and a second output terminal 122, which are connected to an LED 300. An input voltage VB is supplied by the input power source 200 to the DC-DC converter 100 and is increased or decreased by the DC-DC converter 100. The increased or decreased input voltage VB is output to the LED 300 as an output voltage Vo of the DC-DC converter 100. The DC-DC converter 100 according to the present embodiment has the function of keeping the output voltage Vo constant at a targeted voltage (hereinafter referred to as target voltage) irrespective of variation in the input voltage VB so that the LED 300 emits light of constant luminance. As described hereinafter, to increase the input voltage VB and keep the output voltage Vo at a target voltage, the DC-DC converter 100 performs a voltage increasing manipulation or a first voltage increasing/decreasing manipulation. In contrast, to decrease the input voltage VB and keep the output voltage Vo at the target voltage, the DC-DC converter 100 performs a second voltage increasing/decreasing manipulation or a voltage decreasing manipulation.

As illustrated in FIG. 1, the DC-DC converter 100 includes a coil 30, an input unit 10, and an output unit 20. The input unit 10 is connected to the output unit 20 through the coil 30. The input unit 10 includes the input terminals 111 and 112. The first input terminal 111 is connected to a high-potential electrode of the input power source 200, and the second input terminal 112 is connected to a low-potential electrode of the input power source 200. The output unit 20 includes the output terminals 121 and 122. The first output terminal 121 is connected to an anode electrode of the LED 300, and the second output terminal 122 is connected to a cathode electrode of the LED 300.

The input unit 10 includes a first input wire 10a and a second input wire 10b. The first input wire 10a extends from the first input terminal 111 to an end of the coil 30. The second input wire 10b extends from the second input terminal 112 to the end of the coil 30. The input unit 10 also includes an input capacitor 11, a voltage decreasing switch 12, and an input diode 13. The input capacitor 11 is connected between the first input wire 10a and the second input wire 10b. The voltage decreasing switch 12 is disposed on the first input wire 10a. The input diode 13 is disposed on the second input wire 10b. The input capacitor 11 has an end that is connected to the first input wire 10a between the first input terminal 111 and the voltage decreasing switch 12. The input capacitor 11 has the other end that is connected to the second input wire 10b between the second input terminal 112 and the input diode 13. The input diode 13 has an anode electrode, which is connected to the second input terminal 112, and has a cathode electrode, which is connected to the end of the coil 30. The voltage decreasing switch 12 has a control electrode. When a Hi level signal is input to the control electrode, the voltage decreasing switch 12 is turned on. When a Lo level signal is input to the control electrode, the voltage decreasing switch 12 is turned off. Specifically, the voltage decreasing switch 12 is an N-channel MOSFET.

The output unit 20 includes a first output wire 20a and a second output wire 20b. The first output wire 20a extends from the other end of the coil 30 to the first output terminal 121. The second output wire 20b extends from, the other end of the coil 30 to the second output terminal 122. The output unit 20 also includes an output capacitor 21, an output diode 23, and a voltage increasing switch 22. The output capacitor 21 is connected between the first output wire 20a and the second output wire 20b. The output diode 23 is disposed on the first output wire 20a. The voltage increasing switch 22 is disposed on the second output wire 20b. The output capacitor 21 has an end that is connected to the first output wire 20a between the output diode 23 and the first output terminal 121. The output capacitor 21 has the other end that is connected to the second input wire 10b between the voltage increasing switch 22 and the second output terminal 122. The output diode 23 has an anode electrode, which is connected to the other end of the coil 30, and has a cathode electrode, which is connected to the first output terminal 121. The voltage increasing switch 22 has a control electrode. When a Hi level signal is input to the control electrode, the voltage increasing switch 22 is turned on. When a Lo level signal is input to the control electrode, the voltage increasing switch 22 is turned off. Specifically, the voltage increasing switch 22 is an N-channel MOSFET. In addition to the components described above, the output unit 20 according to the present embodiment includes a current detection resistor 24 for detecting a current flowing to the first output terminal 121 (which is the current flowing into the anode electrode of the LED 300). The current detection resistor 24 is disposed on the first output wire 20a such that the voltage across the current detection resistor 24 is detected by a control unit 40, which is to be described hereinafter.

As illustrated in FIG. 1, the second input wire 10b is connected to the second output wire 20b electrically with a common wire 31. Hence, the common wire 31 and the second output wire 20b are connected to the low-potential electrode of the input power source 200 through the second input wire 10b, with each having a fixed potential. That is, the potentials of the wires 10b, 20b, and 31 are each fixed at a reference potential (a ground potential). This fixes the potentials of the other end of the input capacitor 11, the anode electrode of the input diode 13, an end of the voltage increasing switch 22, the other end of the output capacitor 21, the second output terminal 122, and the cathode electrode of the LED 300 at the ground potential. Thus, the potential of the first output terminal 121 determines the voltage to be applied to the LED 300 (the output voltage Vo).

In addition to the coil 30, the input unit 10, and the output unit 20 described above, the DC-DC converter 100 includes the control unit 40. The control unit 40 controls the switches 12 and 22 so that the switches 12 and 22 are turned on and off and thereby keeps the output voltage Vo constant irrespective of variation in the input voltage VB. As illustrated in FIG. 1, the control unit 40 includes a current detecting circuit 41, a duty calculation circuit 42, a digital-to-analog converter circuit 43, a sawtooth wave generating circuit 44, a comparator 45, an OR gate 46, a NOT gate 47, and an AND gate 48. The current detecting circuit 41 acquires the voltage across the current detection resistor 24 and determines the current flowing through the first output wire 20a using the resistance value of the current detection resistor 24 stored in the current detecting circuit 41. That is, the current detecting circuit 41 detects the current flowing into the anode electrode of the LED 300 (an output current based on the output voltage Vo). The output current detected by the current detecting circuit 41 is input to the duty calculation circuit 42.

The duty calculation circuit 42 generates pulse signals for keeping the output current described above at a target current, which is a current detected by the current detecting circuit 41 when the output voltage Vo is at the target voltage. The duty calculation circuit 42 generates a manipulation signal Sm and a duty signal Sd on the basis of the output current and the target current. The manipulation signal Sm determines the voltage increasing manipulation, the voltage decreasing manipulation, and the voltage increasing/decreasing manipulations. The duty signal Sd determines the duty ratios (an on time and an off time) of the switches 12 and 22. The manipulation signal Sm, the duty signal Sd, and the duty calculation circuit 42 will be described in detail hereinafter.

The digital-to-analog converter circuit 43 converts the duty signal Sd, which is a digital signal, to an analog signal. The analog duty signal Sd resulting from the conversion by the digital-to-analog converter circuit 43 is input to the comparator 45. The duty signal Sd illustrated in FIGS. 2 to 5 is an analog signal resulting from the conversion.

Figure 4:
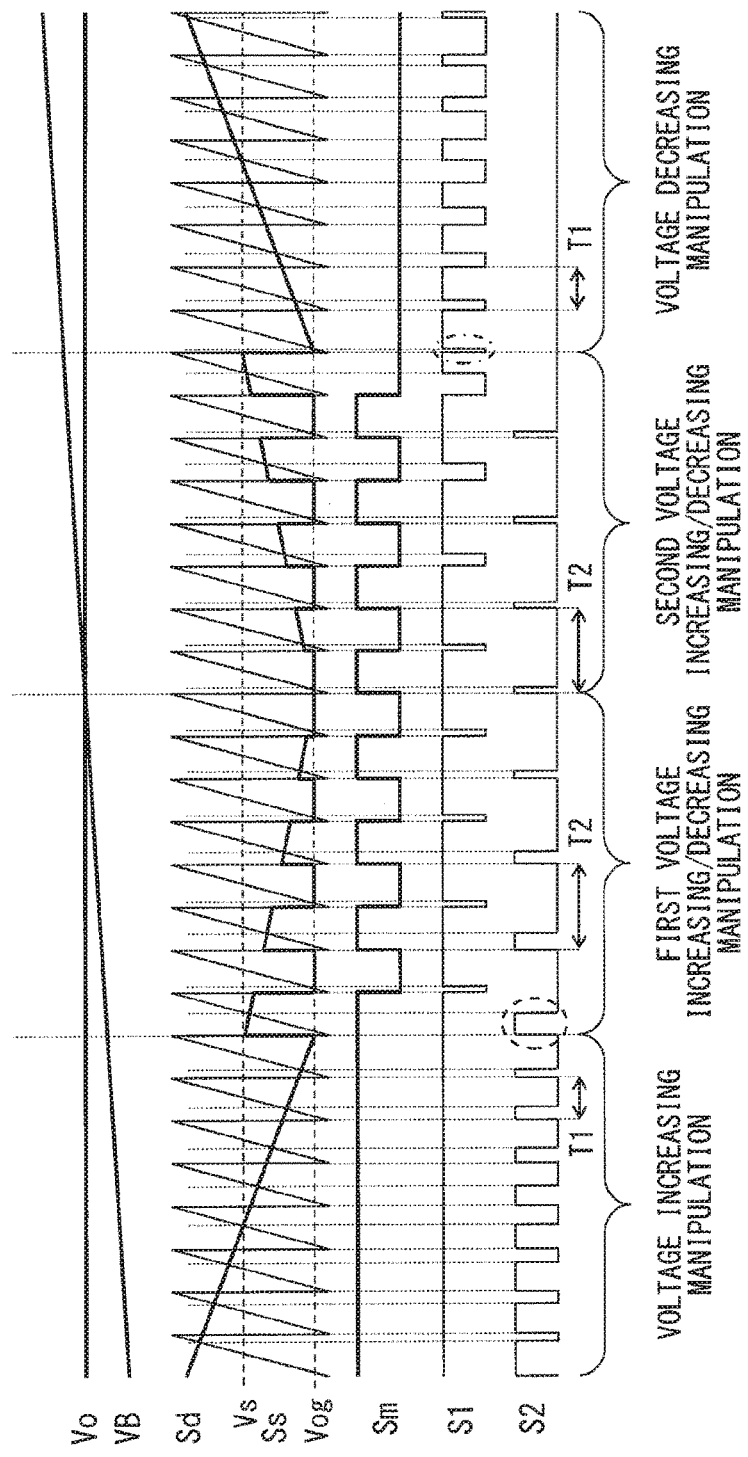
FIG. 4 is a timing chart illustrating signals of the DC-DC converter transmitted when an input voltage is increased.
Figure 5:
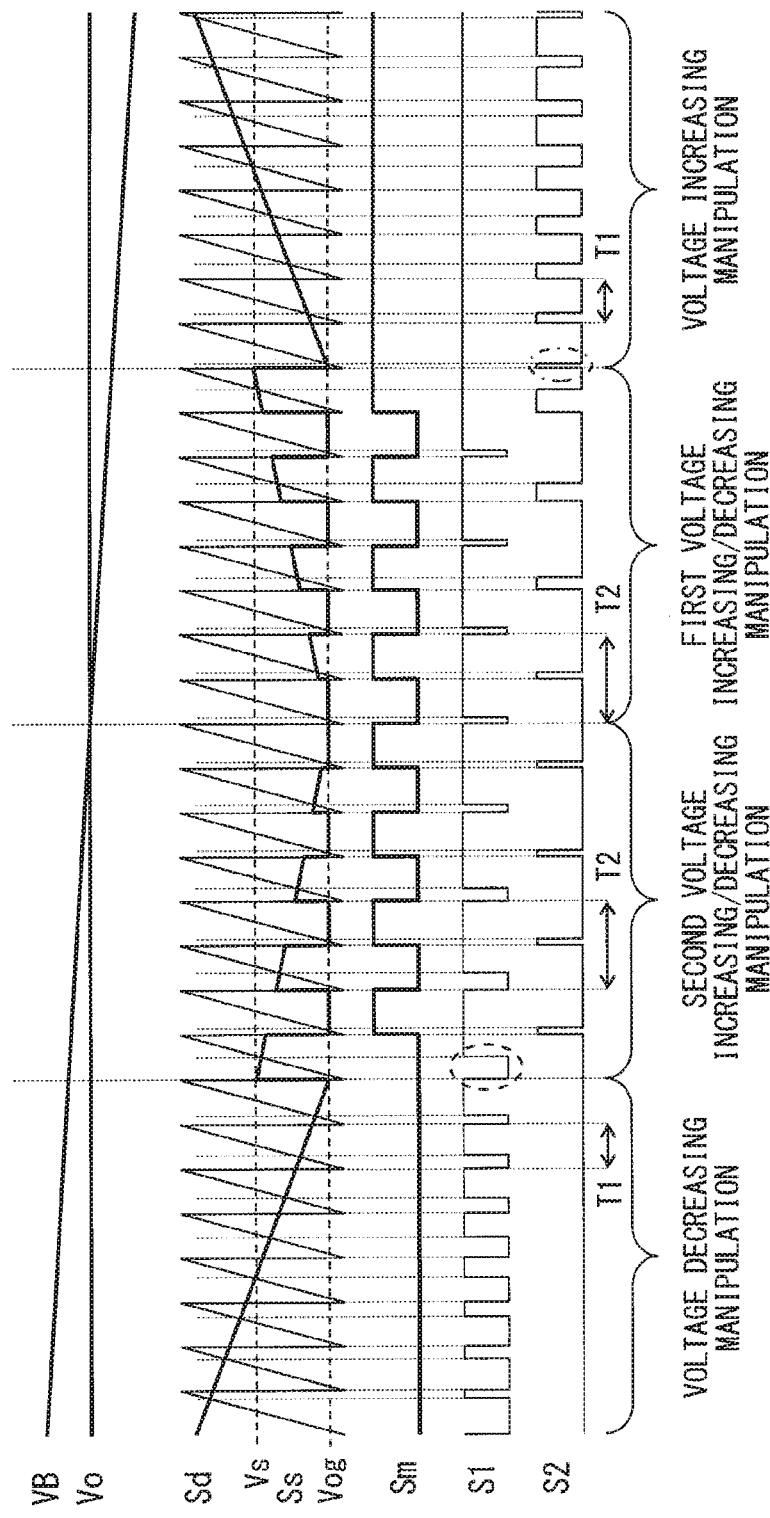
FIG. 5 is a timing chart illustrating signals of the DC-DC converter transmitted when the input voltage is decreased.
Figure 6:
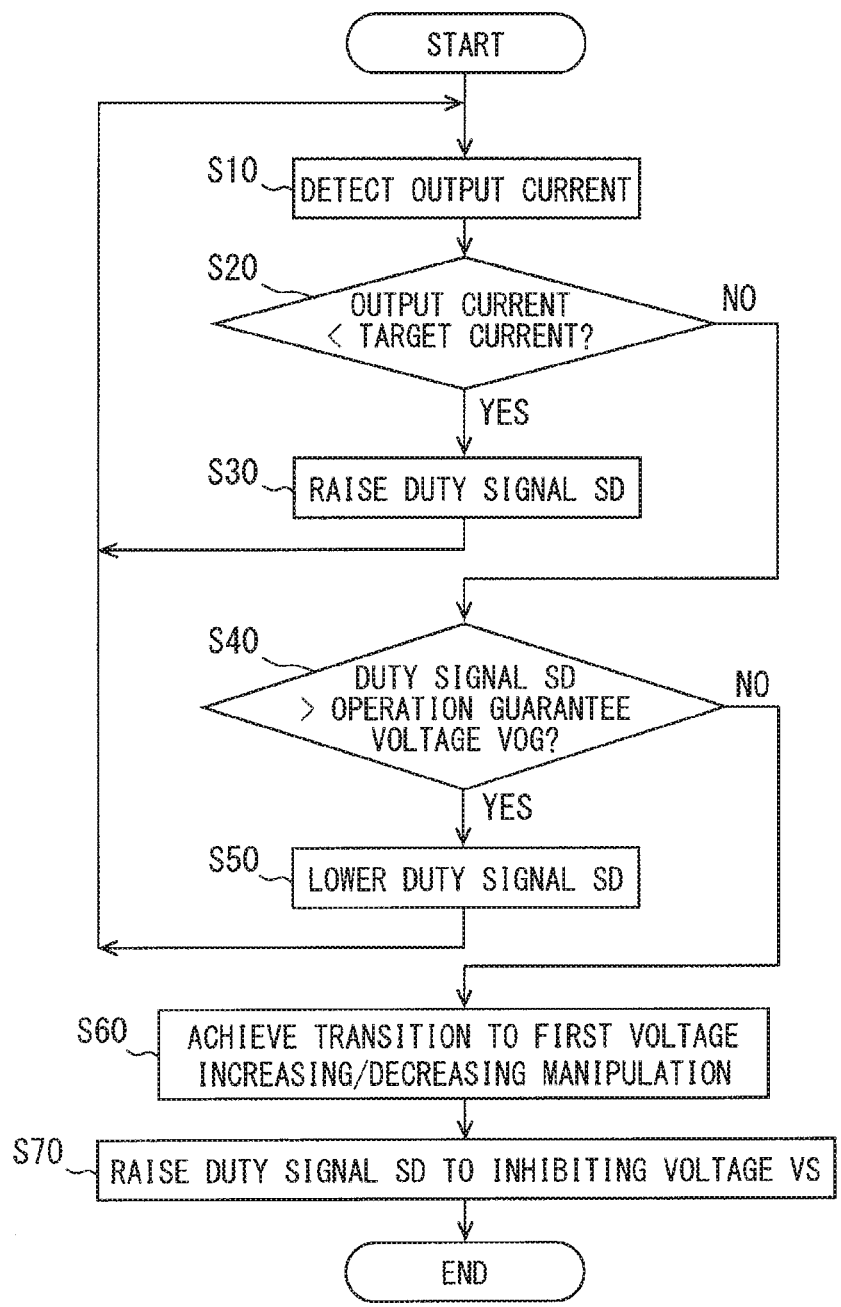
FIG. 6 is a flowchart of processing of a duty calculation circuit in a voltage increasing manipulation.
Figure 7:
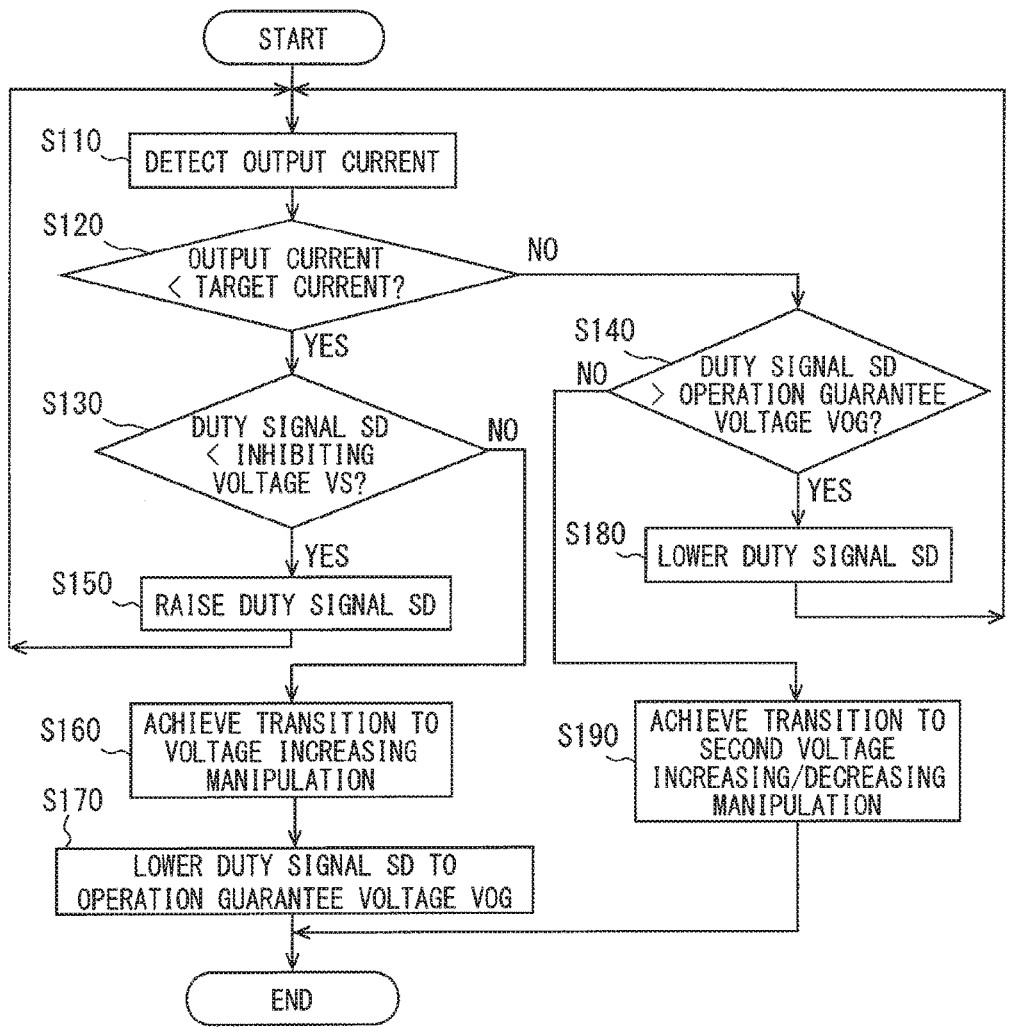
FIG. 7 is a flowchart of processing of the duty calculation circuit in a first voltage increasing/decreasing manipulation.

The sawtooth wave generating circuit 44 generates a sawtooth signal Ss, the voltage level of which increases and decreases periodically. As illustrated in FIGS. 4 and 5, the voltage level of a sawtooth wave included in the sawtooth signal Ss rises at a steady rate of increase from its lowest level and, upon reaching the highest level, drops to the lowest level instantaneously, with a waveform shaped in a right-angled triangle. The sawtooth signal Ss having such sawtooth waves is input to the comparator 45.

The comparator 45 compares the analog duty signal Sd resulting from the conversion to the sawtooth signal Ss and outputs a Hi signal or a Lo signal depending on the result of the comparison. In the present embodiment, the duty signal Sd is input to a non-inverting input terminal of the comparator 45, and the sawtooth signal Ss is input to an inverting input terminal of the comparator 45. Hence, if the duty signal Sd has a voltage level higher than that of the sawtooth signal Ss, the comparator 45 outputs a Hi signal. If the duty signal Sd has a voltage level lower than that of the sawtooth signal Ss, the comparator 45 outputs a Lo signal. The output signal of the comparator 45 is input to the OR gate 46 via the NOT gate 47; the output signal of the comparator 45 is input to the AND gate 48 as it is.

The OR gate 46 is a logical gate that outputs a Hi signal if at least one of two input signals is at a Hi level and that outputs a Lo signal if both of the two input signals are at Lo levels. The OR gate 46 has two input terminals. One of the input terminals is connected to an output terminal of the comparator 45 via the NOT gate 47, and the other one of the input terminals is connected to an output terminal of the duty calculation circuit 42, which outputs the manipulation signal Sm. The OR gate 46 has an output terminal that is connected to the control electrode (a gate electrode) of the voltage decreasing switch 12. The NOT gate 47 has the function of inverting the voltage level. The NOT gate 47 outputs a Lo signal if the comparator 45 outputs a Hi signal. The NOT gate 47 outputs a Hi signal if the comparator 45 outputs a Lo signal. If at least one of the manipulation signal Sm and the output signal of the NOT gate 47 is at a Hi level, the OR gate 46 outputs a Hi signal. If both of the manipulation signal Sm and the output signal of the NOT gate 47 are at Lo levels, the OR gate 46 outputs a Lo signal. The output signal of the OR gate 46 is input, as a voltage decreasing control signal S1, to the gate electrode of the voltage decreasing switch 12. If the voltage decreasing control signal S1 achieves a Hi level, the voltage decreasing switch 12 is turned on. If the voltage decreasing control signal S1 achieves a Lo level, the voltage decreasing switch 12 is turned off.

The AND gate 48 is a logical gate that outputs a Hi signal if both of two input signals are at Hi levels and that outputs a Lo signal if at least one of the two input signals is at a Lo level. The manipulation signal Sm and the output signal of the comparator 45 are input to the AND gate 48. The AND gate 48 has an output terminal that is connected to the control electrode (a gate electrode) of the voltage increasing switch 22. If both of the manipulation signal Sm and the output signal of the comparator 45 are at Hi levels, the AND gate 48 outputs a Hi signal. If at least one of the manipulation signal Sm and the output signal of the comparator 45 is at a Lo level, the AND gate 48 outputs a Lo signal. The output signal of the AND gate 48 is input, as a voltage increasing control signal S2, to the gate electrode of the voltage increasing switch 22. If the voltage increasing control signal S2 achieves a Hi level, the voltage increasing switch 22 is turned on. If the voltage increasing control signal S2 achieves a Lo level, the voltage increasing switch 22 is turned off.

Figure 2:
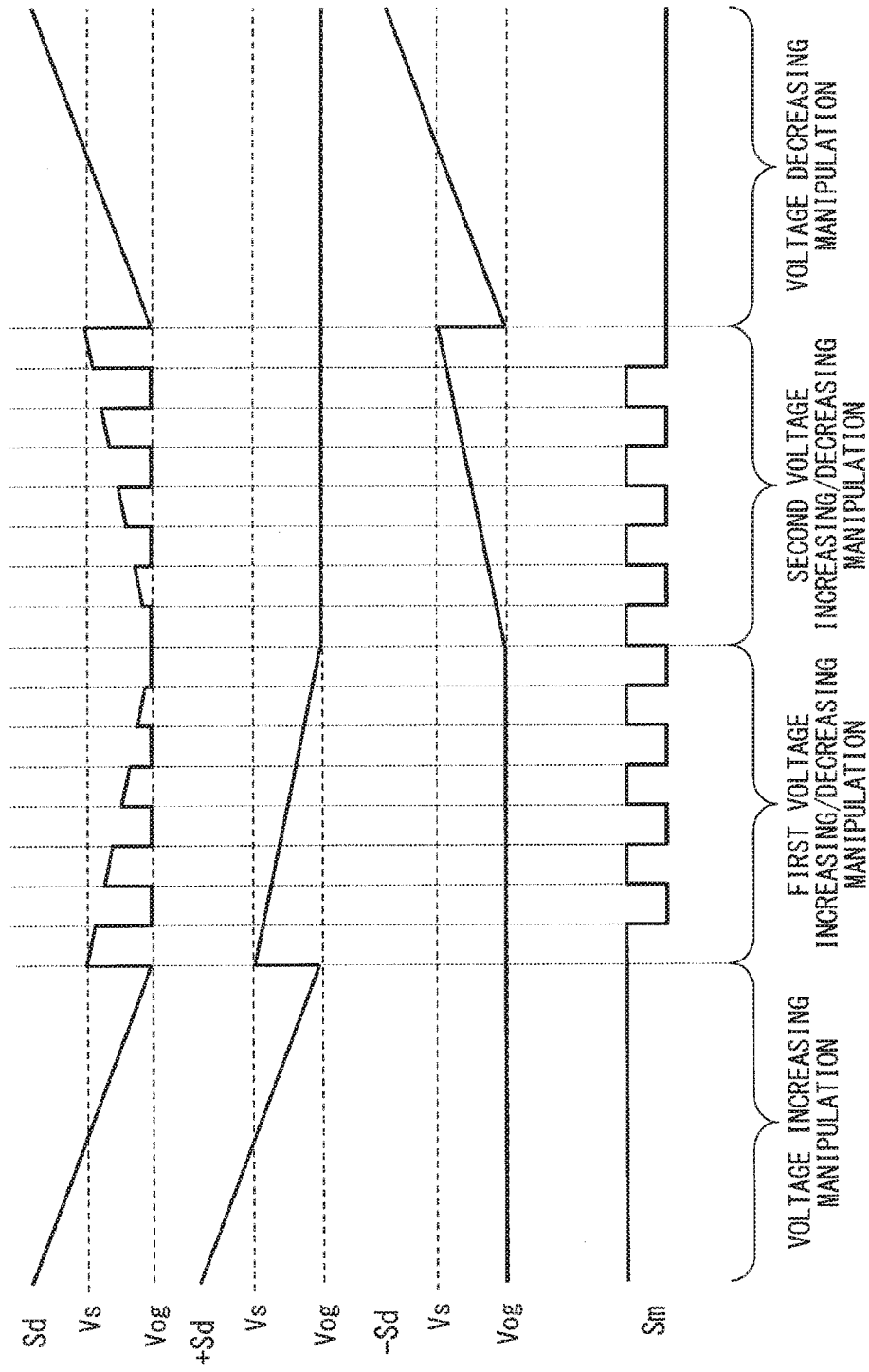
FIG. 2 is a timing chart for describing a duty signal.
Figure 3:
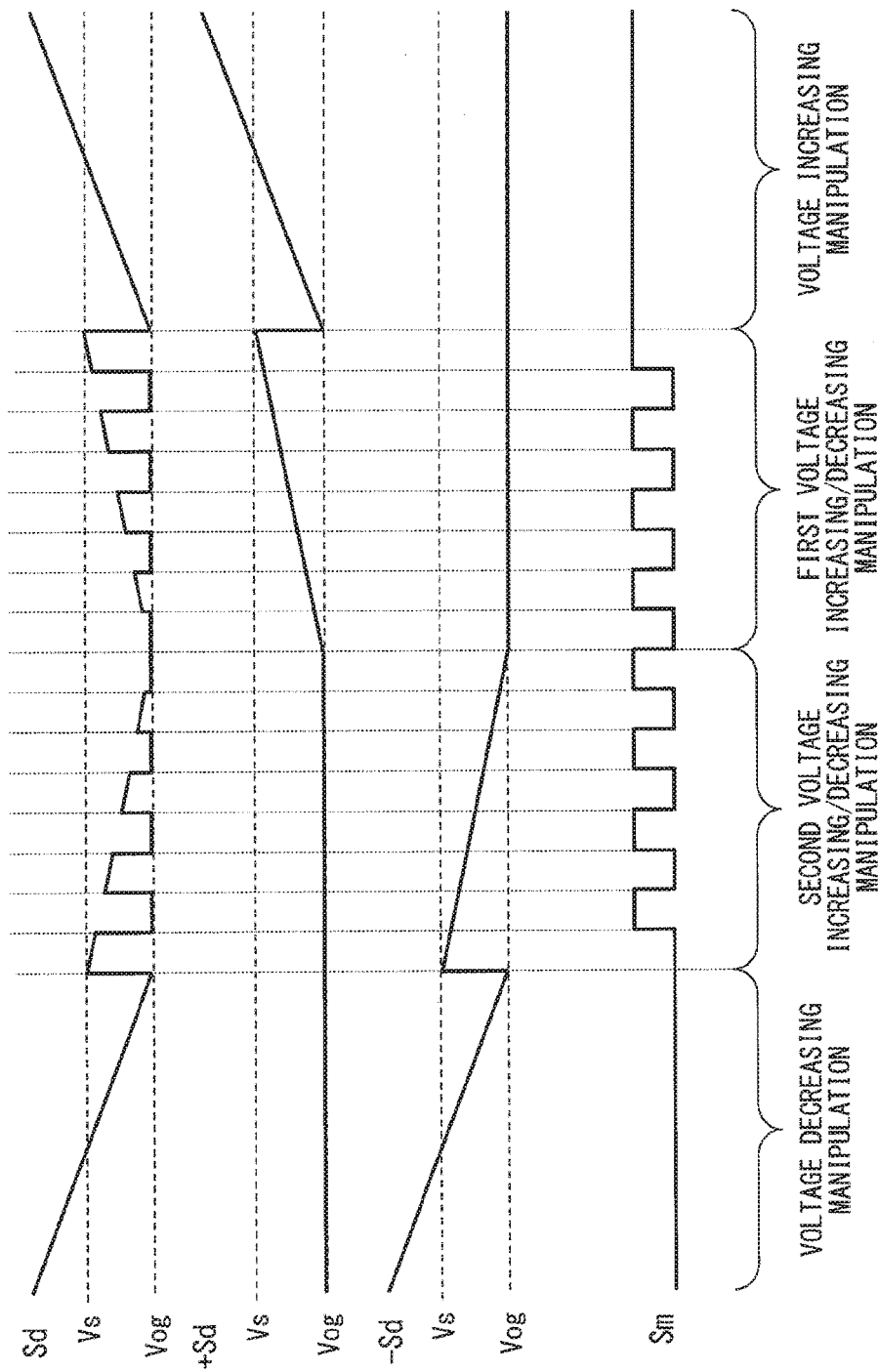
FIG. 3 is a timing chart for describing the duty signal.

The manipulation signal Sm and the duty signal Sd, which are generated by the duty calculation circuit 42, will now be described. The manipulation signal Sm is a pulse signal that has the duty ratio of 100% in the voltage increasing manipulation, the duty ratio of 50% in the two voltage increasing/decreasing manipulations, and the duty ratio of 0% in the voltage decreasing manipulation. In the two voltage increasing/decreasing manipulations, the pulse width of the manipulation signal Sm is half the pulse period of the manipulation signal Sm. Since the manipulation signal Sm behaves in the manner described above, its voltage level is fixed at the Hi level in the voltage increasing manipulation, changes between the Hi level and the Lo level alternately in the voltage increasing/decreasing manipulations, and is fixed at the Lo level in the voltage decreasing manipulation. Note that, as illustrated in FIGS. 2 and 4, the manipulation signal Sm is kept at the Hi level for a pulse width (for a half of the pulse period) in a transition from the voltage increasing manipulation to the first voltage increasing/decreasing manipulation, such that the first voltage increasing/decreas-ing manipulation begins with the Hi level. Also note that, as illustrated in FIGS. 3 and 5, the manipulation signal Sm is kept at the Lo level for a pulse width (for a half of the pulse period) in a transition from the voltage decreasing manipu-lation to the second voltage increasing/decreasing manipu-lation, such that the second voltage increasing/decreasing manipulation begins with the Lo level.

As illustrated in FIGS. 4 and 5, the manipulation signal Sm has a pulse period T2 that is twice the length of a period T1 of a sawtooth wave included in the sawtooth signal Ss (hereinafter referred to as sawtooth period T1). In the voltage increasing/decreasing manipulations, the length of time for which one pulse of the manipulation signal Sm is at the Hi level (a pulse width r) is equal to the length of time of one sawtooth period T1. In each period of time in which a pulse of the manipulation signal Sm is at the Hi level or at the Lo level, a sawtooth wave included in the sawtooth signal Ss rises and falls instantaneously.

The duty signal Sd changes its voltage level in response to the output current, the target current, and the manipulation signal Sm. The duty calculation circuit 42 generates, as signals for generating the duty signal Sd, a first duty signal +Sd and a second duty signal −Sd illustrated in FIGS. 2 and 3. The voltage levels of these two signals are determined in response to the output current and the target current, and one of the signals is output, as the duty signal Sd, from the duty calculation circuit 42 in response to the voltage level of the manipulation signal Sm. Specifically, when the voltage level of the manipulation signal Sm is at the Hi level, the first duty signal +Sd is output, and when the voltage level of the manipulation signal Sm is at the Lo level, the second duty signal −Sd is output. As described above, the voltage level of the manipulation signal Sm is fixed at the Hi level in the voltage increasing manipulation, changes between the Hi level and the Lo level alternately in the voltage increasing/decreasing manipulations, and is fixed at the Lo level in the voltage decreasing manipulation. Thus, the first duty signal +Sd is output as the duty signal Sd in the voltage increasing manipulation. The first duty signal +Sd and the second duty signal −Sd are output alternately as the duty signal Sd in the voltage increasing/decreasing manipulations. The second duty signal −Sd is output as the duty signal Sd in the voltage decreasing manipulation.

The duty calculation circuit 42 has stored an operation guarantee voltage Vog and an inhibiting voltage Vs, which are specified values. The operation guarantee voltage Vog is for guaranteeing the operation of the DC-DC converter 100. The inhibiting voltage Vs is for inhibiting the output voltage Vo from undershooting or overshooting in a changeover of the manipulations described above. The duty calculation circuit 42 adjusts the voltage levels of the duty signals +Sd and −Sd on the basis of these voltages Vog and Vs, the output current, and the target current. The duty signals +Sd and −Sd behave in response to the output current and the target current as described below.

As illustrated in FIG. 2, the first duty signal +Sd changes its voltage level in the voltage increasing manipulation and the first voltage increasing/decreasing manipulation and keeps its voltage level constant in the second voltage increasing/decreasing manipulation and the voltage decreas-ing manipulation. Specifically, if the output current is higher than the target current in the voltage increasing manipula-tion, the first duty signal +Sd lowers its voltage level and, upon its voltage level lowering to the operation guarantee voltage Vog, rapidly raises its voltage level so as to reach the inhibiting voltage Vs. If the output current is higher than the target current in the first voltage increasing/decreasing manipulation, the first duty signal +Sd lowers its voltage level from the inhibiting voltage Vs and, upon its voltage level lowering to the operation guarantee voltage Vog, fixes its voltage level at the operation guarantee voltage Vog.

As illustrated in FIG. 3, the second duty signal −Sd changes its voltage level in the second voltage increasing/decreasing manipulation and the voltage decreasing manipulation and keeps its voltage level constant in the voltage increasing manipulation and the first voltage increasing/decreasing manipulation. Specifically, if the output current is lower than the target current in the voltage decreasing manipulation, the second duty signal −Sd lowers its voltage level and, upon its voltage level lowering to the operation guarantee voltage Vog, rapidly raises its voltage level so as to reach the inhibiting voltage Vs. If the output current is lower than the target current in the second voltage increasing/decreasing manipulation, the second duty signal −Sd lowers its voltage level and, upon its voltage level lowering to the operation guarantee voltage Vog, fixes its voltage level at the operation guarantee voltage Vog.

The voltage level of the operation guarantee voltage Vog is set somewhat higher than the lowest voltage level of the sawtooth signal Ss. This is for determining the maximum duty ratio of the voltage decreasing control signal S1 in the first voltage increasing/decreasing manipulation and the minimum duty ratio of the voltage increasing control signal S2 in the second voltage increasing/decreasing manipulation according to the difference in voltage level of the duty signal Sd and the sawtooth signal Ss, as described hereinafter. The lowest voltage levels of the first duty signal +Sd and the second duty signal −Sd may be voltage levels that are somewhat higher than the operation guarantee voltage Vog, instead of the voltage levels that agree with the operation guarantee voltage Vog as described above.

An operation of the DC-DC converter 100 according to the present embodiment will now be described with reference to FIGS. 4 and 5. Note that, although the DC-DC converter 100 controls the output voltage Vo so as to keep the output voltage Vo constant, the output voltage Vo varies to some extent in actuality. To provide clear and concise description, the output voltage Vo is illustrated as a constant target voltage in FIGS. 4 and 5.

In FIG. 4, the input voltage VB gradually increases from a voltage level lower than that of the output voltage Vo (the target voltage), until it exceeds the output voltage Vo and still keeps rising gradually. In this case, to keep the output current at the target current, the duty calculation circuit 42 changes the manipulations; that is, it performs the voltage increasing manipulation, the first voltage increasing/decreasing manipulation, the second voltage increasing/decreasing manipulation, and the voltage decreasing manipulation in the order set forth. In FIG. 5, the input voltage VB gradually decreases from a voltage level higher than that of the output voltage Vo (the target voltage), until it falls below the output voltage Vo and still keeps decreasing gradually. In this case, to keep the output current at the target current, the duty calculation circuit 42 changes the manipulations; that is, it performs the voltage decreasing manipulation, the second voltage increasing/decreasing manipulation, the first voltage increasing/decreasing manipulation, and the voltage increasing manipulation in the order set forth.

As illustrated in FIGS. 4 and 5, the sawtooth waves included in the sawtooth signal Ss do not change in waveform and period irrespective of variation in voltage level of the input voltage VB, thereby performing the function as a reference signal. In contrast, the duty signal Sd and the manipulation signal Sm change as the voltage level of the input voltage VB varies (as the output current varies), which results in change also to the control signals S1 and S2.

For simplicity, the relationship between the signals Sm and Sd and the control signals S1 and S2 will be described below before the description of the manipulations. When the manipulation signal Sm is at the Hi level, the voltage decreasing control signal S1 achieves the Hi level independently of the duty signal Sd. When the manipulation signal Sm is at the Hi level and the voltage level of the duty signal Sd is higher than that of a sawtooth wave, the voltage increasing control signal S2 achieves the Hi level. When the manipulation signal Sm is at the Hi level and the voltage level of the duty signal Sd is lower than that of a sawtooth wave, the voltage increasing control signal S2 achieves the Lo level. When the manipulation signal Sm is at the Lo level, the voltage increasing control signal S2 achieves the Lo level independently of the duty signal Sd. When the manipulation signal Sm is at the Lo level and the voltage level of the duty signal Sd is higher than that of a sawtooth wave, the voltage decreasing control signal S1 achieves the Lo level. When the manipulation signal Sm is at the Lo level and the voltage level of the duty signal Sd is lower than that of a sawtooth wave, the voltage decreasing control signal S1 achieves the Hi level. Each of the manipulations will now be described.

As illustrated in FIG. 4, since the manipulation signal Sm is at the Hi level in the voltage increasing manipulation, the voltage decreasing control signal S1 is at the Hi level, causing the voltage decreasing switch 12 to stay on. The voltage level of the duty signal Sd gradually declines when the output current is higher than the target current. Hence, periods of time in which the voltage level of the duty signal Sd is higher than those of the sawtooth waves included in the sawtooth signal Ss become gradually shorter. This causes the pulse width of the voltage increasing control signal S2 to gradually shorten for each sawtooth period T1. This behavior of the voltage increasing control signal S2 controls the voltage increasing switch 22 such that the voltage increasing switch 22 is turned on and off alternately in each sawtooth period T1 and that the on time (the pulse width) of the voltage increasing switch 22 shortens as the voltage level of the duty signal Sd declines to move closer to the operation guarantee voltage Vog.

As described above, in the voltage increasing manipulation, the voltage decreasing switch 12 is controlled so that it stays on, while the voltage increasing switch 22 is controlled so that it is turned on and off. When the voltage increasing switch 22 is on, a current based on the input voltage VB flows via the coil 30 to the second input terminal 112. Meanwhile, energy is accumulated in the coil 30. When the voltage increasing switch 22 is then turned off, a current based on the input voltage VB and the energy accumulated in the coil 30 flows to the first output terminal 121. This operation increases the time average value of the output voltage Vo so as to be higher than that of the input voltage VB, increasing the input voltage VB. The quantity of voltage increase grows as the on time of the voltage increasing switch 22 is extended. Hence, as the voltage level of the duty signal Sd declines to move closer to the operation guarantee voltage Vog, the on time of the voltage increasing switch 22 shortens, which gradually reduces the quantity of voltage increase. In this manner, the output current is kept at the target current irrespective of a rise in the input voltage VB. As illustrated in FIG. 5, as the voltage level of the duty signal Sd rises to move away from the operation guarantee voltage Vog, the pulse width of the voltage increasing control signal S2 grows, which gradually extends the on time of the voltage increasing switch 22. This gradually increases the quantity of voltage increase and thereby keeps the output current at the target current irrespective of a decline in the input voltage VB.

The voltage decreasing manipulation will now be described. As described in FIG. 4, since the manipulation signal Sm is at the Lo level in the voltage decreasing manipulation, the voltage increasing control signal S2 is at the Lo level, causing the voltage increasing switch 22 to stay off. The voltage level of the duty signal Sd gradually rises when the output current is higher than the target current. Hence, periods of time in which the voltage level of the duty signal Sd is higher than those of the sawtooth waves become gradually longer. This causes the pulse width of the voltage decreasing control signal S1 to gradually shorten for each sawtooth period T1. This behavior of the voltage decreasing control signal S1 controls the voltage decreasing switch 12 such that the voltage decreasing switch 12 is turned on and off alternately in each sawtooth period T1 and that the on time (the pulse width) of the voltage decreasing switch 12 shortens as the voltage level of the duty signal Sd rises to move away from the operation guarantee voltage Vog. In other words, the off time of the voltage decreasing switch 12 becomes longer as the voltage level of the duty signal Sd rises to move farther away from the operation guarantee voltage Vog.

As described above, in the voltage decreasing manipulation, the voltage decreasing switch 12 is controlled so that it is turned on and off, while the voltage increasing switch 22 is controlled so that it stays off. When the voltage decreasing switch 12 is on, a current based on the input voltage VB flows via the coil 30 to the first output terminal 121. When the voltage decreasing switch 12 is turned off, the current stops flowing through the coil 30. This operation reduces the time average value of the output voltage Vo so as to be lower than the input voltage VB, decreasing the input voltage VB. The quantity of voltage decrease grows as the off time of the voltage decreasing switch 12 is extended. Hence, as the voltage level of the duty signal Sd rises to move away from the operation guarantee voltage Vog, the off time of the voltage decreasing switch 12 is extended, which gradually increases the quantity of voltage decrease. In this manner, the output current is kept at the target current irrespective of a rise in the input voltage VB. As illustrated in FIG. 5, as the voltage level of the duty signal Sd declines to move closer to the operation guarantee voltage Vog, the pulse width of the voltage decreasing control signal S1 grows, which gradually shortens the off time of the voltage decreasing switch 12. This gradually reduces the quantity of voltage decrease and thereby keeps the output current at the target current irrespective of a decline in the input voltage VB.

The first voltage increasing/decreasing manipulation and the second voltage increasing/decreasing manipulation will now be described. As illustrated in FIGS. 4 and 5, the voltage level of the manipulation signal Sm changes with the duty ratio 50% in the first voltage increasing/decreasing manipulation and the second voltage increasing/decreasing manipulation. In each period of time in which a pulse of the manipulation signal Sm is at the Hi level or at the Lo level, a sawtooth wave included in the sawtooth signal Ss rises gradually and falls instantaneously. Pulses of the duty signal Sd rise and fall repeatedly in accordance with the pulse period T2 of the manipulation signal Sm.

In the first voltage increasing/decreasing manipulation, a pulse of the duty signal Sd rises when a pulse of the manipulation signal Sm rises. The pulse of the duty signal Sd falls when the pulse of the manipulation signal Sm falls. As in the case with the voltage increasing manipulation, the voltage levels of pulses of the duty signal Sd gradually decline when the output current is higher than the target current. Hence, periods of time in which the voltage level of the duty signal Sd is higher than those of the sawtooth waves included in the sawtooth signal Ss become gradually shorter. This causes the pulse width of the voltage increasing control signal S2 to gradually shorten for each sawtooth period T1 and the on time of the voltage increasing switch 22 to thereby shorten as the voltage level of the duty signal Sd declines to move closer to the operation guarantee voltage Vog. In a period of time in which a pulse of the duty signal Sd is at higher levels, the voltage decreasing switch 12 is controlled so as to stay on, and the voltage increasing switch 22 is controlled so as to be turned on and off. This is when an increasing manipulation is performed on the input voltage VB. The lowest levels of the sawtooth waves are lower than the operation guarantee voltage Vog. Thus, while, after a fall of a pulse of the duty signal Sd that coincides with a fall of the manipulation signal Sm, the voltage level of the duty signal Sd is fixed at the operation guarantee voltage Vog, there is a period of time in which the voltage level of the duty signal Sd becomes higher than that of a sawtooth wave, albeit briefly. This is when the voltage decreasing control signal S1 achieves the Lo level, causing the voltage decreasing switch 12 to be turned off. The duty ratio of the voltage decreasing control signal S1 is maximized in this manner, with the maximum value determined by the operation guarantee voltage Vog. While a pulse of the duty signal Sd is at the Lo level, the voltage decreasing switch 12 is controlled so as to be turned on and off, and the voltage increasing switch 22 is controlled so as to stay off. This is when a decreasing manipulation is performed on the input voltage VB. The increasing and decreasing manipulations are performed alternately on the input voltage VB in the first voltage increasing/decreasing manipulation in the manner described above. The duty ratio of the voltage decreasing control signal S1 is fixed at a maximum value, and the duty ratio of the voltage increasing control signal S2 changes in accordance with the output current. Thus, the quantity of voltage decrease is fixed at a minimum value, and the quantity of voltage increase changes in accordance with the output current.

In the second voltage increasing/decreasing manipulation, a pulse of the duty signal Sd rises when a pulse of the manipulation signal Sm falls. The pulse of the duty signal Sd falls when the pulse of the manipulation signal Sm rises. As in the case with the voltage decreasing manipulation, the voltage levels of pulses of the duty signal Sd gradually rise when the output current is higher than the target current. Hence, periods of time in which the voltage level of the duty signal Sd is higher than those of the sawtooth waves included in the sawtooth signal Ss become gradually longer. This causes the pulse width of the voltage decreasing control signal S1 to gradually shorten for each sawtooth period T1 and the on time of the voltage decreasing switch 12 to thereby shorten as the voltage level of the duty signal Sd rises to move away from the operation guarantee voltage Vog. In other words, the off time of the voltage decreasing switch 12 becomes longer as the voltage level of the duty signal Sd rises to move farther away from the operation guarantee voltage Vog. In a period of time in which a pulse of the duty signal Sd is at higher levels, the voltage decreasing switch 12 is controlled so as to be turned on and off, and the voltage increasing switch 22 is controlled so as to stay off. This is when a decreasing manipulation is performed on the input voltage VB. While, after a fall of a pulse of the duty signal Sd, the voltage level of the duty signal Sd is fixed at the operation guarantee voltage Vog, there is a period of time in which the voltage level of the duty signal Sd becomes higher than that of a sawtooth wave, albeit briefly. This is when the voltage increasing control signal S2 achieves the Hi level, causing the voltage increasing switch 22 to be turned on. The duty ratio of the voltage increasing control signal S2 is minimized in this manner, with the minimum value determined by the operation guarantee voltage Vog. While a pulse of the duty signal Sd is at the Lo level, the voltage decreasing switch 12 is controlled so as to stay on, and the voltage increasing switch 22 is controlled so as to be turned on and off. This is when an increasing manipulation is performed on the input voltage VB. The increasing and decreasing manipulations are performed alternately on the input voltage VB in the second voltage increasing/decreasing manipulation in the manner described above. The duty ratio of the voltage increasing control signal S2 is fixed at a minimum value, and the duty ratio of the voltage decreasing control signal S1 changes in accordance with the output current. Thus, the quantity of voltage increase is fixed at a minimum value, and the quantity of voltage decrease changes in accordance with the output current.

The increasing manipulations and decreasing manipulations are performed in the first voltage increasing/decreasing manipulation and the second voltage increasing/decreasing manipulation in the manner described above. Thus, the quantity of voltage increase of the first voltage increasing/decreasing manipulation is lower than that of the voltage increasing manipulation, and the quantity of voltage decrease of the second voltage increasing/decreasing manipulation is lower than that of the voltage decreasing manipulation. Conversely, the quantity of voltage increase of the voltage increasing manipulation is higher than that of the first voltage increasing/decreasing manipulation, and the quantity of voltage decrease of the voltage decreasing manipulation is higher than that of the second voltage increasing/decreasing manipulation. The quantity of voltage increase in the first voltage increasing/decreasing manipulation and the quantity of voltage decrease in the second voltage increasing/decreasing manipulation depend on the off time of the voltage decreasing control signal S1 and the on time of the voltage increasing control signal S2 in each pulse period T2.

The quantity of voltage increase in a transition from the voltage increasing manipulation to the first voltage increasing/decreasing manipulation and the quantity of voltage decrease in a transition from the second voltage increasing/decreasing manipulation to the voltage decreasing manipulation will now be described with reference to FIG. 4. In the transition from the voltage increasing manipulation to the first voltage increasing/decreasing manipulation, the voltage level of the manipulation signal Sm is held at the Hi level for the pulse width τ, and the voltage level of the duty signal Sd rapidly rises from the operation guarantee voltage Vog to the inhibiting voltage Vs and then declines gradually. These signal behaviors cause a pulse width of the voltage increasing control signal S2 at the beginning of the first voltage increasing/decreasing manipulation, as marked with a dashed line in FIG. 4, to be longer than a pulse width of the voltage increasing control signal S2 at the end of the voltage increasing manipulation, leading to a temporary growth of the quantity of voltage increase. As a result, no temporary drop of the quantity of voltage increase occurs in the transition from the voltage increasing manipulation to the first voltage increasing/decreasing manipulation, which thus inhibits the voltage level of the output voltage Vo from lowering temporarily (from undershooting).

In a transition from the second voltage increasing/decreasing manipulation to the voltage decreasing manipulation, a pulse of the manipulation signal Sm falls so that the voltage level achieves the Lo level, and the voltage level of the duty signal Sd rapidly drops from the inhibiting voltage Vs to the operation guarantee voltage Vog and then rises gradually. These signal behaviors cause a period of time in which the voltage decreasing control signal S1 is at the Lo level at the beginning of the voltage decreasing manipulation, as marked with a dashed and single-dotted line in FIG. 4, to be shorter than a period of time in which the voltage decreasing control signal S1 is at the Lo level at the end of the second voltage increasing/decreasing manipulation, leading to a temporary reduction of the quantity of voltage decrease. As a result, no temporary growth of the quantity of voltage decrease occurs in the transition from the second voltage increasing/decreasing manipulation to the voltage decreasing manipulation, which thus inhibits the voltage level of the output voltage Vo from lowering temporarily (from undershooting).

The quantity of voltage decrease in a transition from the voltage decreasing manipulation to the second voltage increasing/decreasing manipulation and the quantity of voltage increase in a transition from the first voltage increasing/decreasing manipulation to the voltage increasing manipulation will now be described with reference to FIG. 5. In the transition from the voltage decreasing manipulation to the second voltage increasing/decreasing manipulation, the voltage level of the manipulation signal Sm is held at the Lo level for the pulse width τ, and the voltage level of the duty signal Sd rapidly rises from the operation guarantee voltage Vog to the inhibiting voltage Vs and then declines gradually. These signal behaviors cause a period of time in which the voltage decreasing control signal S1 is at the Lo level at the beginning of the second voltage increasing/decreasing manipulation, as marked with a dashed line in FIG. 5, to be longer than a period of time in which the voltage decreasing control signal S1 is at the Lo level at the end of the voltage decreasing manipulation, leading to a temporary growth of the quantity of voltage decrease. As a result, no temporary drop of the quantity of voltage decrease occurs in the transition from the voltage decreasing manipulation to the second voltage increasing/decreasing manipulation, which thus inhibits the voltage level of the output voltage Vo from rising temporarily (from overshooting).

In a transition from the first voltage increasing/decreasing manipulation to the voltage increasing manipulation, a pulse of the manipulation signal Sm rises so that the voltage level achieves the Hi level, and the voltage level of the duty signal Sd rapidly drops from the inhibiting voltage Vs to the operation guarantee voltage Vog and then rises gradually. These signal behaviors cause a pulse width of the voltage increasing control signal S2 at the beginning of the voltage increasing manipulation, as marked with a dashed and single-dotted line in FIG. 5, to be shorter than a pulse width of the voltage increasing control signal S2 at the end of the first voltage increasing/decreasing manipulation, leading to a temporary reduction of the quantity of voltage increase. As a result, no temporary growth of the quantity of voltage increase occurs in the transition from the first voltage increasing/decreasing manipulation to the voltage increasing manipulation, which thus inhibits the voltage level of the output voltage Vo from rising temporarily (from overshooting).

Processing of the duty calculation circuit 42 in the voltage increasing manipulation, the first voltage increasing/decreasing manipulation, the second voltage increasing/decreasing manipulation, and the voltage decreasing manipulation will be described below with reference to FIGS. 6 to 9. The voltage increasing manipulation is mainly described in FIG. 6, and the first voltage increasing/decreasing manipulation is mainly described in FIG. 7. The second voltage increasing/decreasing manipulation is mainly described in FIG. 8, and the voltage decreasing manipulation is mainly described in FIG. 9. While which one of these four manipulations is to be performed first does not have to be determined, the voltage increasing manipulation is performed first in the present embodiment. The duty signal Sd for the voltage increasing manipulation has a predetermined initial value. Although the duty signal Sd is one of the duty signals +Sd and −Sd as described above, they are described below as the duty signal Sd without the distinction for simplicity.

The voltage increasing manipulation will now be described. As described in FIG. 6, the duty calculation circuit 42 detects an output current in step S10. The duty calculation circuit 42 then determines whether the output current is lower than a target current in step S20. If it is determined that the output current is lower than the target current, the duty calculation circuit 42 proceeds to step S30. If it is determined that the output current is equal to or higher than the target current, the duty calculation circuit 42 proceeds to step S40.

In step S30 where the output current is lower than the target current, the duty calculation circuit 42 raises the voltage level of the duty signal Sd so as to extend the on time of the voltage increasing control signal S2 and thereby increase the quantity of voltage increase. Then, the duty calculation circuit 42 reverts to step S10. Repeating steps S10 to S30 raises the voltage level of the duty signal Sd gradually and thereby increases the quantity of voltage increase gradually.

In step S40, the duty calculation circuit 42 determines whether the duty signal Sd is higher than the operation guarantee voltage Vog. If it is determined that the duty signal Sd is higher than the operation guarantee voltage Vog, the duty calculation circuit 42 proceeds to step S50. If it is determined that the duty signal Sd is equal to or lower than the operation guarantee voltage Vog, the duty calculation circuit 42 proceeds to step S60.

In step S50 where the output current is equal to or higher than the target current, the duty calculation circuit 42 lowers the voltage level of the duty signal Sd so as to shorten the on time of the voltage increasing control signal S2 and thereby reduce the quantity of voltage increase. Then, the duty calculation circuit 42 reverts to step S10. Repeating steps S10, S20, S40, and S50 lowers the voltage level of the duty signal Sd gradually and thereby reduces the quantity of voltage increase gradually. Then, if it is determined that the duty signal Sd is lower than the operation guarantee voltage Vog, the duty calculation circuit 42 proceeds to step S60.

In step S60, the duty calculation circuit 42 achieves a transition to the first voltage increasing/decreasing manipulation in order to further reduce the quantity of voltage increase and then proceeds to step S70.

In step S70, the duty calculation circuit 42 raises the voltage level of the duty signal Sd to the inhibiting voltage Vs in order to inhibit the output voltage Vo from undershooting due to temporary reduction of the quantity of voltage increase. Then, the duty calculation circuit 42 performs the first voltage increasing/decreasing manipulation as described in FIG. 7.

The first voltage increasing/decreasing manipulation will now be described. As described in FIG. 7, the duty calculation circuit 42 detects the output current in step S110. Then, the duty calculation circuit 42 determines whether the output current is lower than the target current in step S120. If it is determined that the output current is lower than the target current, the duty calculation circuit 42 proceeds to step S130. If it is determined that the output current is equal to or higher than the target current, the duty calculation circuit 12 proceeds to step S140.

In step S130, the duty calculation circuit 42 determines whether the duty signal Sd is lower than the inhibiting voltage Vs. If it is determined that the duty signal Sd is lower than the inhibiting voltage Vs, the duty calculation circuit 42 proceeds to step S150. If it is determined that the duty signal Sd is equal to or higher than the inhibiting voltage Vs, the duty calculation circuit 42 proceeds to step S160.

In step S150 where the output current is lower than the target current, the duty calculation circuit 42 raises the voltage level of the duty signal Sd so as to extend the on time of the voltage increasing control signal S2 and thereby increase the quantity of voltage increase. Then, the duty calculation circuit 42 reverts to step S110. Repeating steps S110 to S130 and S150 raises the voltage level of the duty signal Sd gradually and thereby increases the quantity of voltage increase gradually. Then, if it is determined that the duty signal Sd is equal to or higher than the inhibiting voltage Vs, the duty calculation circuit 42 proceeds to step S160.

In step S160, the duty calculation circuit 42 achieves a transition to the voltage increasing manipulation in order to further increase the quantity of voltage increase and then proceeds to step S170.

In step S170, the duty calculation circuit 42 lowers the voltage level of the duty signal Sd to the operation guarantee voltage Vog in order to inhibit the output voltage Vo from overshooting due to temporary rise of the quantity of voltage increase. Then, the duty calculation circuit 42 performs the voltage increasing manipulation as described in FIG. 6.

If it is determined in step S120 that the output current is equal to or higher than the target current and the duty calculation circuit 42 proceeds to step S140, the duty calculation circuit 42 determines whether the duty signal Sd is higher than the operation guarantee voltage Vog. If it is determined that the duty signal Sd is higher than the operation guarantee voltage Vog, the duty calculation circuit 42 proceeds to step S180. If it is determined that the duty signal Sd is equal to or lower than the operation guarantee voltage Vog, the duty calculation circuit 42 proceeds to step S190.

In step S180 where the output current is equal to or higher than the target current, the duty calculation circuit 42 lowers the voltage level of the duty signal Sd so as to shorten the on time of the voltage increasing control signal S2 and thereby reduce the quantity of voltage increase. Then, the duty calculation circuit 42 reverts to step S110. Repeating steps S110, S120, S140, and S180 lowers the voltage level of the duty signal Sd gradually and thereby reduces the quantity of voltage increase gradually. Then, if it is determined that the duty signal Sd is lower than the operation guarantee voltage Vog, the duty calculation circuit 42 proceeds to step S190.

In step S190, the duty calculation circuit 42 achieves a transition to the second voltage increasing/decreasing manipulation in order to decrease the input voltage VB.

Figure 8:
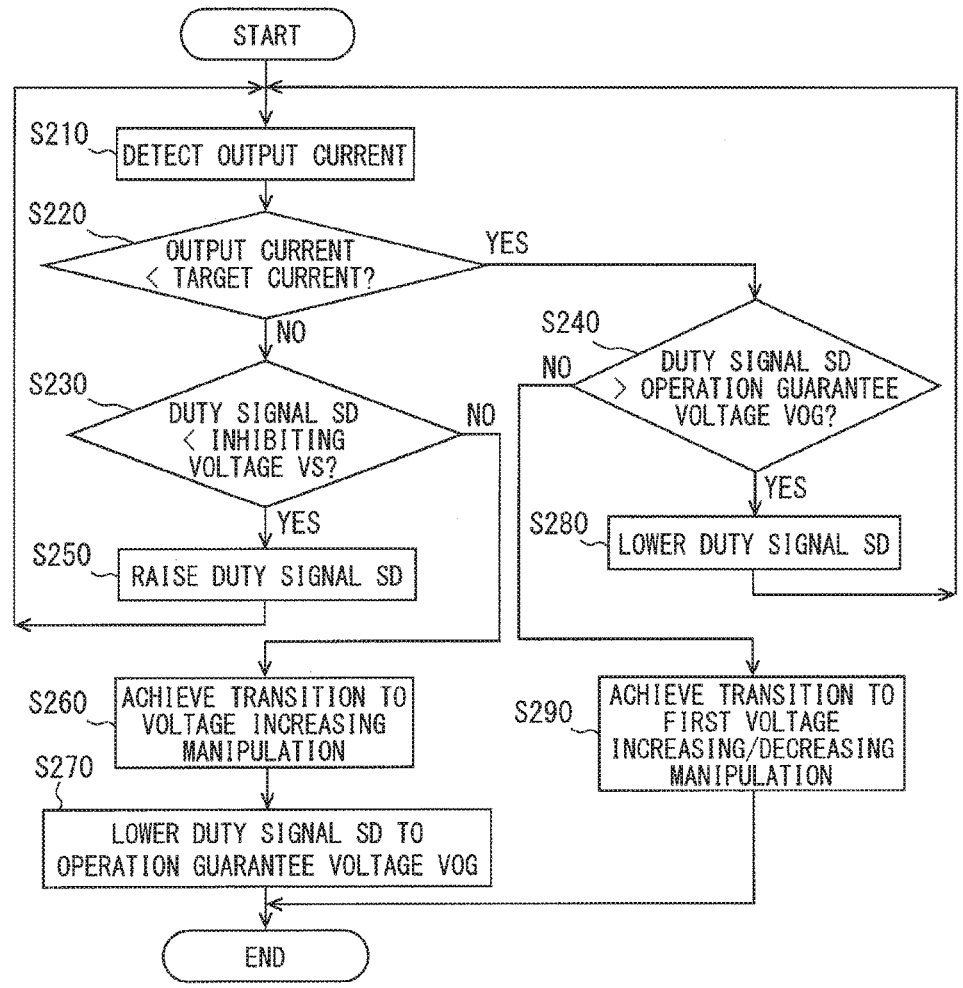
FIG. 8 is a flowchart of processing of the duty calculation circuit in a second voltage increasing/decreasing manipulation.
Figure 9:
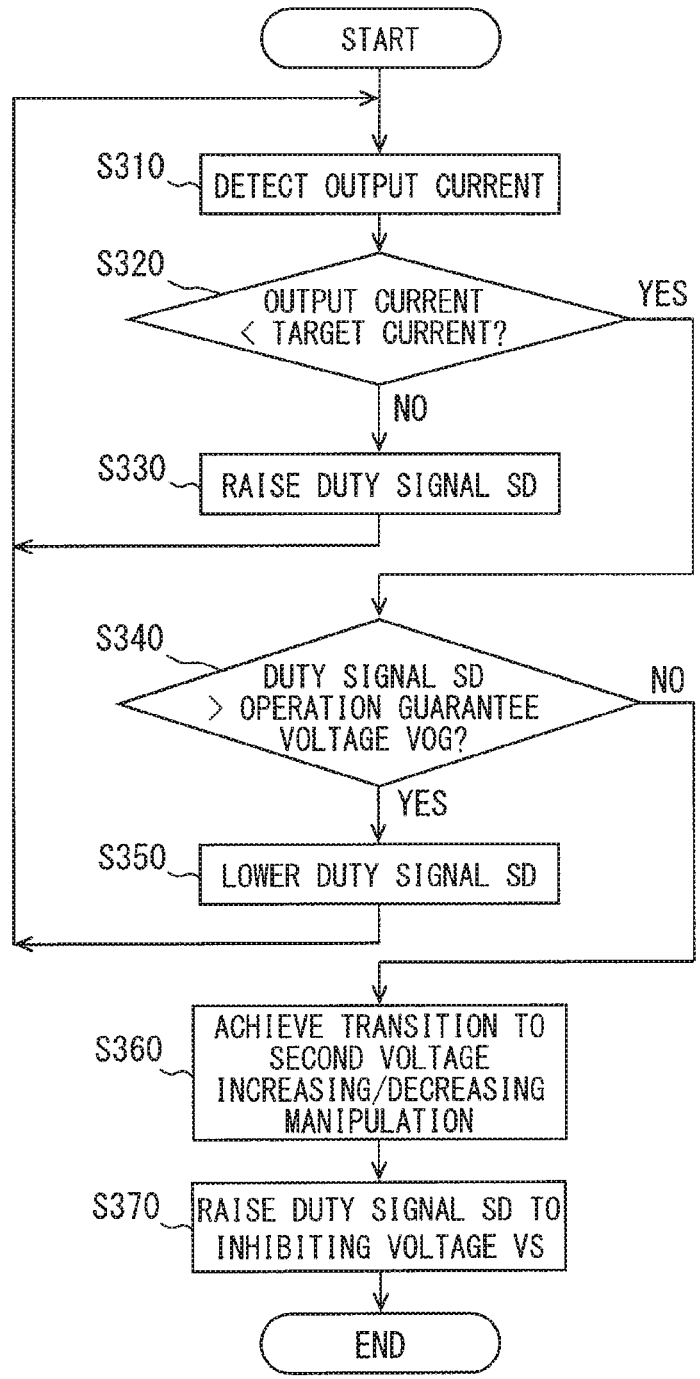
FIG. 9 is a flowchart of processing of the duty calculation circuit in a voltage decreasing manipulation.

Then, the duty calculation circuit 42 performs the second voltage increasing/decreasing manipulation as described in FIG. 8.

The second voltage increasing/decreasing manipulation will now be described. As described in FIG. 8, the duty calculation circuit 42 detects the output current in step S210. Then, the duty calculation circuit 42 determines whether the output current is lower than the target current in step S220. If it is determined that the output current is equal to or higher than the target current, the duty calculation circuit 42 proceeds to step S230. If it is determined that the output current is lower than the target current, the duty calculation circuit 42 proceeds to step S240.

In step S230, the duty calculation circuit 42 determines whether the duty signal Sd is lower than the inhibiting voltage Vs. If it is determined that the duty signal Sd is lower than the inhibiting voltage Vs, the duty calculation circuit 42 proceeds to step S250. If it is determined that the duty signal Sd is equal to or higher than the inhibiting voltage Vs, the duty calculation circuit 42 proceeds to step S260.

In step S250 where the output current is equal to or higher than the target current, the duty calculation circuit 42 raises the voltage level of the duty signal Sd so as to extend the off time of the voltage decreasing control signal S1 and thereby increase the quantity of voltage decrease. Then, the duty calculation circuit 42 reverts to step S210. Repeating steps S210 to S230 and S250 raises the voltage level of the duty signal Sd gradually and thereby increases the quantity of voltage decrease gradually. Then, if it is determined that the duty signal Sd is equal to or higher than the inhibiting voltage Vs, the duty calculation circuit 42 proceeds to step S260.

In step S260, the duty calculation circuit 42 achieves a transition to the voltage decreasing manipulation in order to further increase the quantity of voltage decrease and then proceeds to step S270.

In step S270, the duty calculation circuit 42 lowers the voltage level of the duty signal Sd to the operation guarantee voltage Vog in order to inhibit the output voltage Vo from undershooting due to temporary rise of the quantity of voltage decrease. Then, the duty calculation circuit 42 performs the voltage decreasing manipulation as described in FIG. 9.

If it is determined in step S220 that the output current is lower than the target current and the duty calculation circuit 42 proceeds to step S240, the duty calculation circuit 42 determines whether the duty signal Sd is higher than the operation guarantee voltage Vog. If it is determined that the duty signal Sd is higher than the operation guarantee voltage Vog, the duty calculation circuit 42 proceeds to step S280. If it is determined that the duty signal Sd is equal to or lower than the operation guarantee voltage Vog, the duty calculation circuit 42 proceeds to step S290.

In step S280 where the output current is lower than the target current, the duty calculation circuit 42 lowers the voltage level of the duty signal Sd so as to shorten the off time of the voltage decreasing control signal S1 and thereby reduce the quantity of voltage decrease. Then, the duty calculation circuit 42 reverts to step S210. Repeating steps S210, S220, S240, and S280 lowers the voltage level of the duty signal Sd gradually and thereby reduces the quantity of voltage decrease gradually. Then, if it is determined that the duty signal Sd is lower than the operation guarantee voltage Vog, the duty calculation circuit 42 proceeds to step S290.

In step S290, the duty calculation circuit 42 achieves a transition to the first voltage increasing/decreasing manipulation in order to increase the input voltage. Then, the duty calculation circuit 42 performs the first voltage increasing/decreasing manipulation as described in FIG. 7.

The voltage decreasing manipulation will now be described. As described in FIG. 9, the duty calculation circuit 42 detects the output current in step S310. The duty calculation circuit 42 then determines whether the output current is lower than the target current in step S320. If it is determined that the output current is equal to or higher than the target current, the duty calculation circuit 42 proceeds to step S330. If it is determined that the output current is lower than the target current, the duty calculation circuit 42 proceeds to step S340.

In step S330 where the output current is equal to or higher than the target current, the duty calculation circuit 42 raises the voltage level of the duty signal Sd so as to extend the off time of the voltage decreasing control signal S1 and thereby increase the quantity of voltage decrease. Then, the duty calculation circuit 42 reverts to step S310. Repeating steps S310 to S330 raises the voltage level of the duty signal Sd gradually and thereby increases the quantity of voltage decrease gradually.

In step S340, the duty calculation circuit 42 determines whether the duty signal Sd is higher than the operation guarantee voltage Vog. If it is determined that the duty signal Sd is higher than the operation guarantee voltage Vog, the duty calculation circuit 42 proceeds to step S350. If it is determined that the duty signal Sd is equal to or lower than the operation guarantee voltage Vog, the duty calculation circuit 42 proceeds to step S360.

In step S350 where the output current is lower than the target current, the duty calculation circuit 42 lowers the voltage level of the duty signal Sd so as to shorten the off time of the voltage decreasing control signal S1 and thereby reduce the quantity of voltage decrease. Then, the duty calculation circuit 42 reverts to step S310. Repeating steps S310, S320, S340, and S350 lowers the voltage level of the duty signal Sd gradually and thereby reduces the quantity of voltage decrease gradually. Then, if it is determined that the duty signal Sd is lower than the operation guarantee voltage Vog, the duty calculation circuit 42 proceeds to step S360.

In step S360, the duty calculation circuit 42 achieves a transition to the second voltage increasing/decreasing manipulation in order to further reduce the quantity of voltage decrease and then proceeds to step S370.

In step S370, the duty calculation circuit 42 raises the voltage level of the duty signal Sd to the inhibiting voltage Vs in order to inhibit the output voltage Vo from overshooting due to temporary reduction of the quantity of voltage decrease. Then, the duty calculation circuit 42 performs the second voltage increasing/decreasing manipulation as described in FIG. 8.

Operational advantages of the DC-DC converter 100 according to the present embodiment will now be described. As described above, the quantity of voltage increase is increased temporarily in a transition from the voltage increasing manipulation to the first voltage increasing/decreasing manipulation, and the quantity of voltage decrease is reduced temporarily in a transition from the second voltage increasing/decreasing manipulation to the voltage decreasing manipulation. This inhibits the output voltage Vo from undershooting due to temporary reduction of the quantity of voltage increase or temporary increase of the quantity of voltage decrease. Additionally, the quantity of voltage decrease is increased temporarily in a transition from the voltage decreasing manipulation to the second voltage increasing/decreasing manipulation, and the quantity of voltage increase is reduced temporarily in a transition from the first voltage increasing/decreasing manipulation to the voltage increasing manipulation. This inhibits the output voltage Vo from overshooting due to temporary reduction of the quantity of voltage decrease or temporary increase of the quantity of voltage increase.

Figure 10:
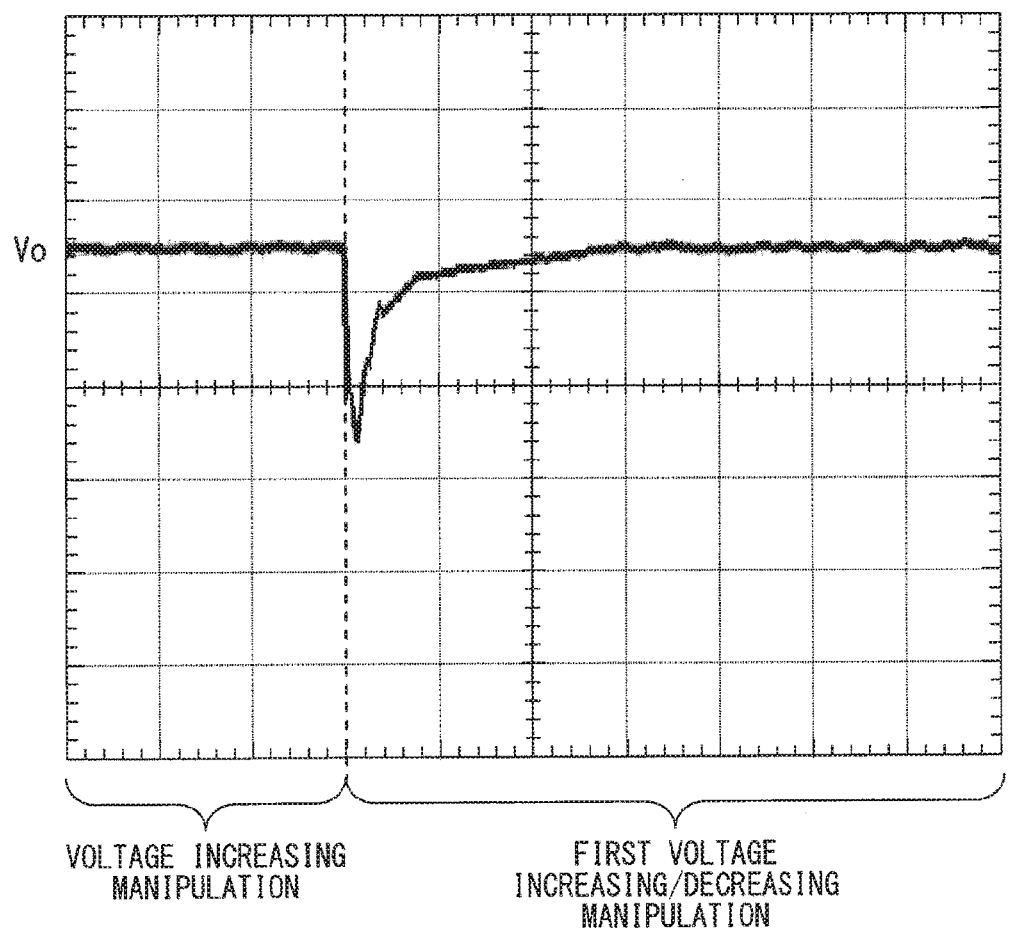
FIG. 10 is a graph illustrating an undershoot occurring in a transition from the voltage increasing manipulation to the first voltage increasing/decreasing manipulation.
Figure 11:
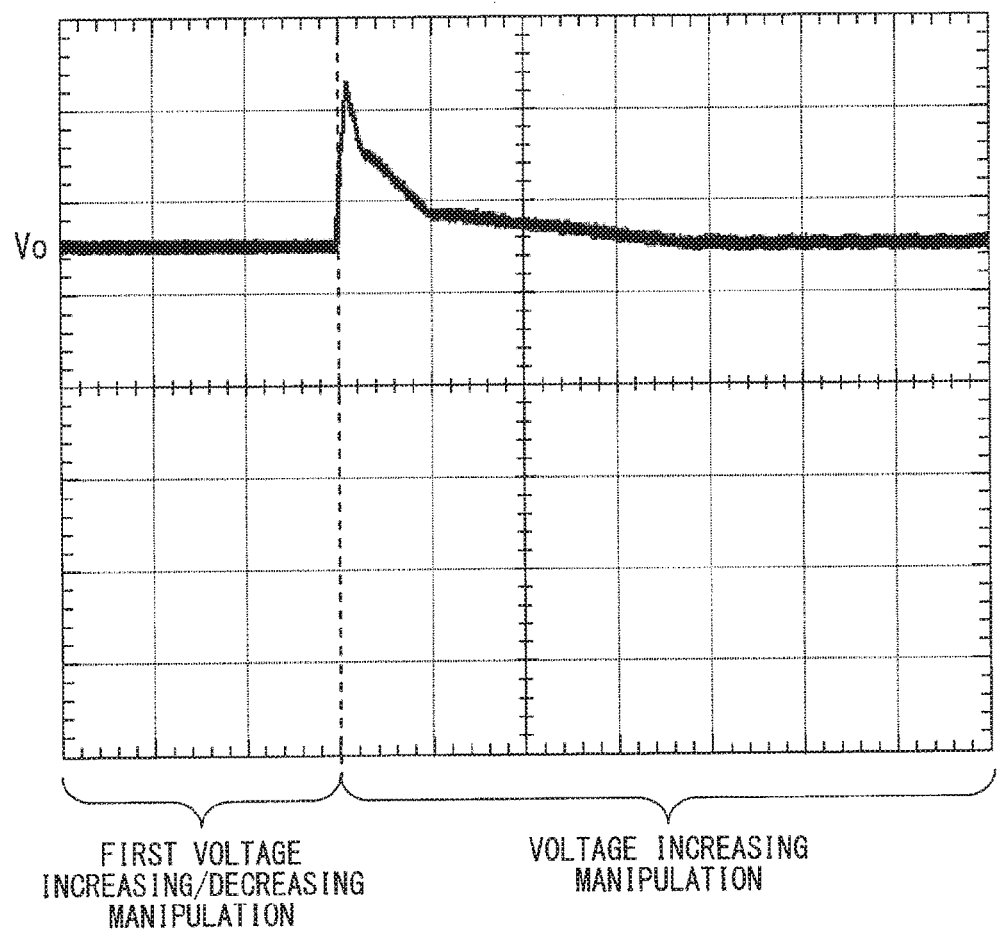
FIG. 11 is a graph illustrating an overshoot occurring in a transition from the first voltage increasing/decreasing manipulation to the voltage increasing manipulation.
Figure 12:
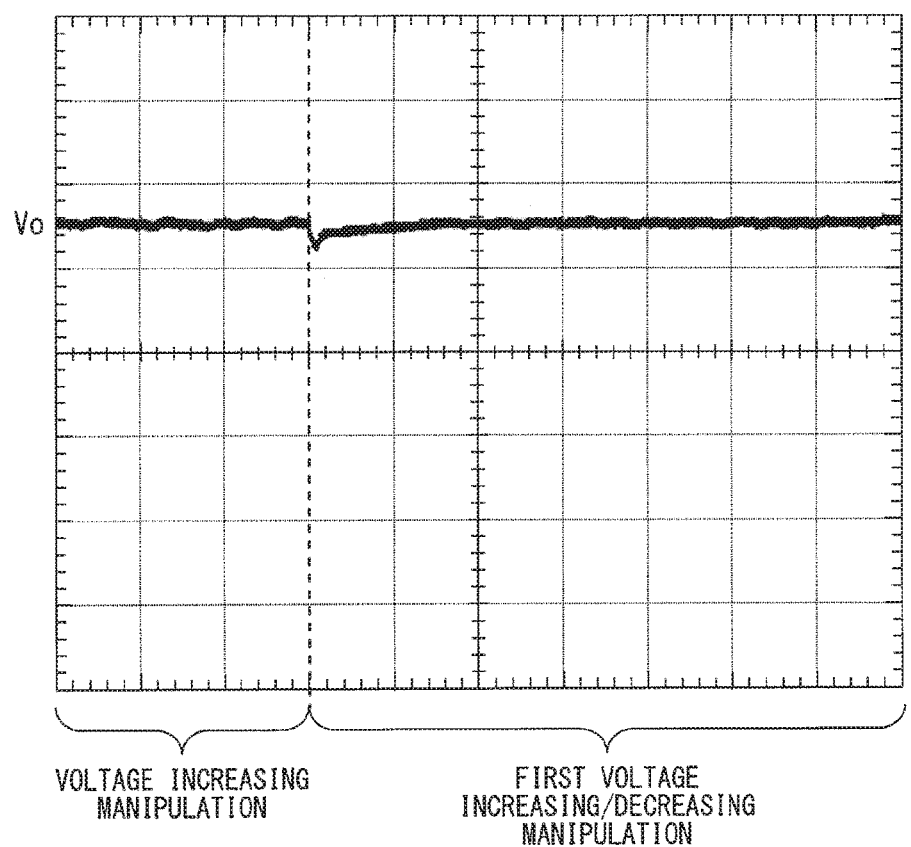
FIG. 12 is a graph illustrating inhibition of an undershoot in the transition from the voltage increasing manipulation to the first voltage increasing/decreasing manipulation.
Figure 13:
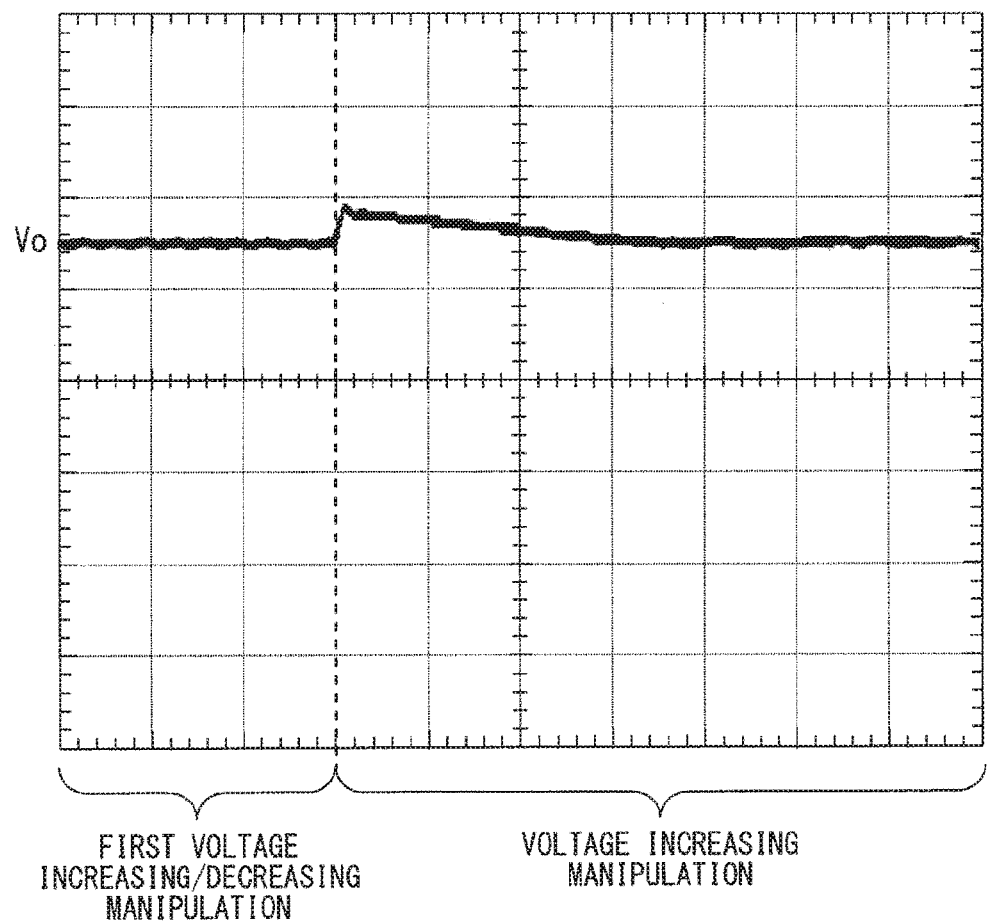
FIG. 13 is a graph illustrating inhibition of an overshoot in the transition from the first voltage increasing/decreasing manipulation to the voltage increasing manipulation.

The operational advantages described above have been verified by experiment conducted by the inventor. Results of the experiment are presented in FIGS. 10 to 13. FIG. 10 illustrates the output voltage Vo exhibited when no temporary increase of the quantity of voltage increase was provided in a transition from the voltage increasing manipulation to the first voltage increasing/decreasing manipulation. It demonstrates that temporary reduction of the quantity of voltage increase occurring in the transition causes the output voltage Vo to undershoot in this case. FIG. 11 illustrates the output voltage Vo exhibited when no temporary reduction of the quantity of voltage increase was provided in a transition from the first voltage, increasing/decreasing manipulation to the voltage increasing manipulation. It demonstrates that temporary increase of the quantity of voltage increase occurring in the transition causes the output voltage Vo to overshoot in this case. In contrast, FIG. 12 illustrates the output voltage Vo exhibited when temporary increase of the quantity of voltage increase was provided in the transition from the voltage increasing manipulation to the first voltage increasing/decreasing manipulation. It demonstrates that the output voltage Vo is inhibited from undershooting in this case. FIG. 13 illustrates the output voltage Vo exhibited when temporary reduction of the quantity of voltage increase was provided in the transition from the first voltage increasing/decreasing manipulation to the voltage increasing manipulation. It demonstrates that the output voltage Vo is inhibited from overshooting in this case.

The inhibition of undershooting and overshooting described above is achieved by adjusting the on time of the voltage increasing switch 22 and the off time of the voltage decreasing switch 12 in a changeover of manipulations. Therefore, in comparison with a configuration that adjusts the number of times that a voltage increasing switch and a voltage decreasing switch are turned on (the number of times that they are switched) in a transition of manipulations, the configuration of the present embodiment inhibits noise, caused by switching of the switches 12 and 22, from increasing its frequency band.

Although a preferable embodiment is described above, the present disclosure is not limited to the embodiment described above in any way, and various modifications are possible without departing from the spirit of the present disclosure.

The present embodiment describes an example in which the DC-DC converter 100 is used for lighting control of the LED 300 for use in an in-vehicle headlamp or the like. However, the use of the DC-DC converter 100 is not limited to the example described above.

In the example described in the present embodiment, the voltage decreasing switch 12 and the voltage increasing switch 22 are N-channel MOSFETs. However, the voltage decreasing switch 12 and the voltage increasing switch 22 are not limited to the example described above and may be, for example, IGBTs.

Figure 14:
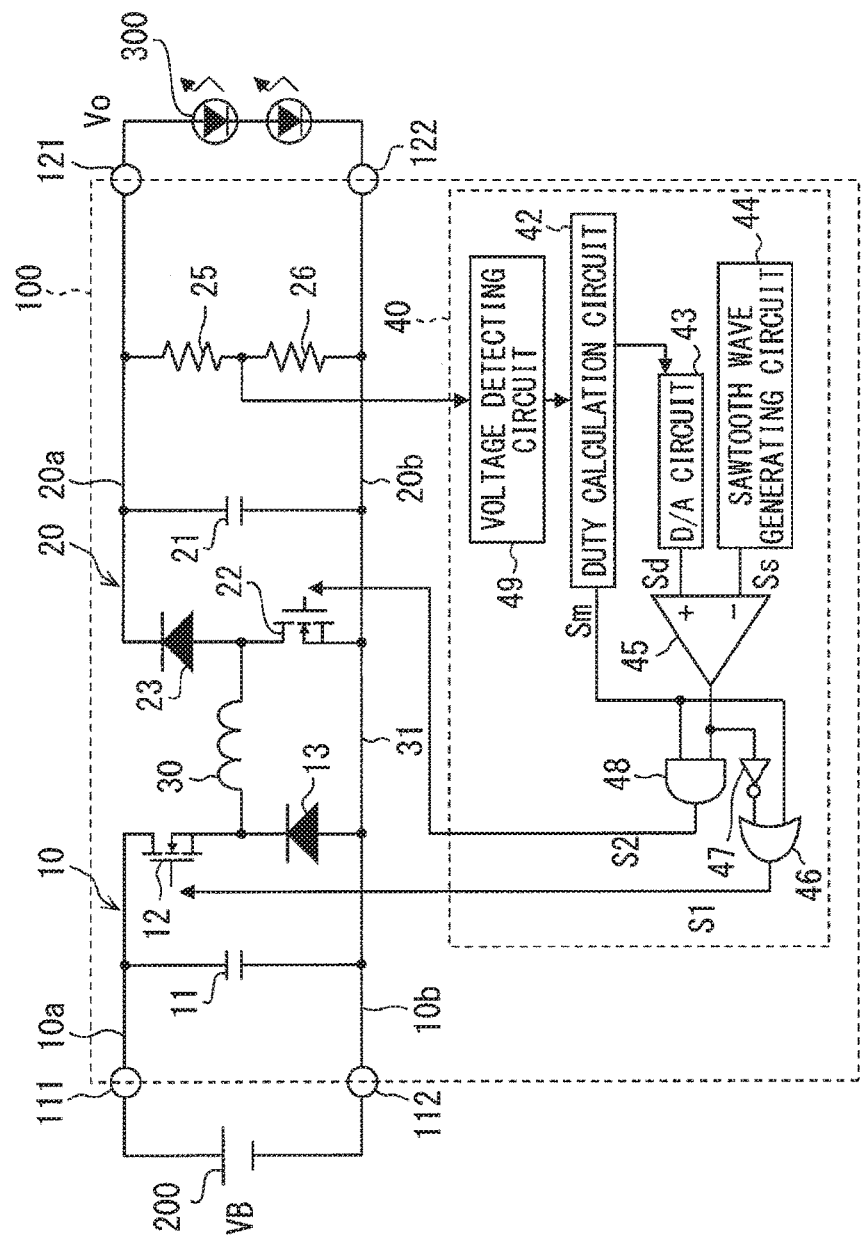
FIG. 14 is a circuit diagram of a modification of the DC-DC converter.
Figure 15:
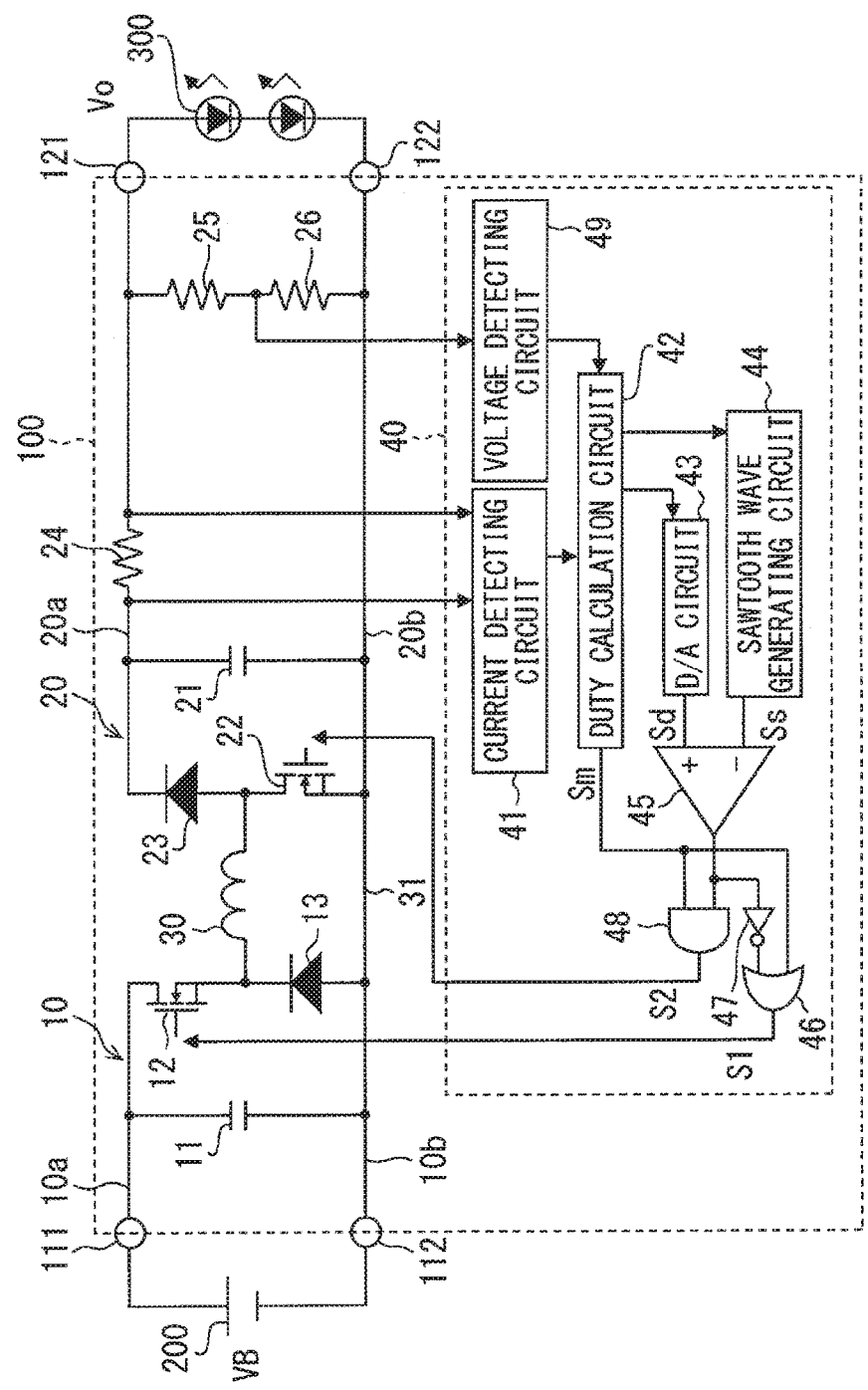
FIG. 15 is a circuit diagram of another modification of the DC-DC converter.

The output unit 20 described in the example in the present embodiment includes the current detection resistor 24. An output unit 20 may include voltage detection resistors 25 and 26 in place of the current detection resistor 24 as illustrated in FIG. 14. In this case, a control unit 40 includes a voltage detecting circuit 49 in place of the current detecting circuit 41. The voltage detection resistors 25 and 26 are connected in series from the first output wire 20a to the second output wire 20b, and a middle point voltage thereof is detected by the voltage detecting circuit 49. The control unit 40 controls the switches 12 and 22 on the basis of the middle point voltage so as to keep the output voltage Vo constant irrespective of variation in the input voltage VB. An output unit 20 may include all of the current detection resistor 24 and the voltage detection resistors 25 and 26, and a control unit 40 may include both of the current detecting circuit 41 and the voltage detecting circuit 49 as illustrated in FIG. 15.

In the example of the present embodiment, the sawtooth period T1 of the sawtooth signal Ss is constant. The sawtooth period T1 may be changed in accordance with the four manipulations. In such a case, however, the pulse period T2 of the manipulation signal Sm remains twice the length of the period T1 of a sawtooth wave included in the sawtooth signal Ss. In this modification, the duty calculation circuit 42 inputs to the sawtooth wave generating circuit 44 a signal that provides an instruction to change the sawtooth period T1 every time a changeover of the manipulations is achieved, as illustrated in FIG. 15.

It is noted that a flowchart or the processing of the flowchart in the present application includes sections (also referred to as steps), each of which is represented, for instance, as S110. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A DC-DC converter that increases or decreases an input voltage supplied from an input power source, and generates an output voltage having a constant voltage level, the DC-DC converter comprising:
   a coil;
   a voltage decreasing switch that is disposed between the input power source and one end of the coil;
   a first output terminal that outputs the output voltage; and a second output terminal that has a potential fixed at a reference potential;
   a voltage increasing switch that is disposed between the second output terminal and the other end of the coil; and
   a control unit that keeps the output voltage at the constant voltage level irrespective of variation in the input voltage by controlling an on-state and an off state of each of the voltage decreasing switch and the voltage increasing switch, wherein:
   the control unit performs a voltage increasing operation for increasing the input voltage or a first voltage increasing and decreasing operation having a voltage increase amount of the input voltage smaller than the voltage increasing operation;
   the control unit performs a voltage decreasing operation for decreasing the input voltage or a second voltage increasing and decreasing operation having a voltage decrease amount of the input voltage smaller than the voltage decreasing operation;

in the voltage increasing operation, the control unit always controls the voltage decreasing switch to be in the on-state, and controls the voltage increasing switch to switch periodically between the on-state and the off-state;

in the voltage decreasing operation, the control unit controls the voltage decreasing switch to switch periodically between the on-state and the off-state, and always controls the voltage increasing switch to be in the off-state;

in each of the first voltage increasing and decreasing operation and the second voltage increasing and decreasing operation, the control unit controls the voltage decreasing switch and the voltage increasing switch to switch with a same period at a different duty ratio between the on-state and the off-state;

when switching from the voltage increasing operation to the first voltage increasing and decreasing operation, the control unit increases an on-state time per one period in the voltage increasing switch at a beginning of the first voltage increasing and decreasing operation to be longer than an end of the voltage increasing operation so as to inhibit the output voltage from undershooting;

when switching from the second voltage increasing and decreasing operation to the voltage decreasing operation, the control unit decreases an off-state time per one period in the voltage decreasing switch at a beginning of the voltage decreasing operation to be shorter than an end of the second voltage increasing and decreasing operation so as to inhibit the output voltage from undershooting;

when switching from the voltage decreasing operation to the second voltage increasing and decreasing operation, the control unit increases the off-state time in the voltage decreasing switch at a beginning of the second voltage increasing and decreasing operation to be longer than an end of the voltage decreasing operation so as to inhibit the output voltage from overshooting; and when switching from the first voltage increasing and decreasing operation to the voltage increasing operation, the control unit decreases the on-state time in the voltage increasing switch at a beginning of the voltage increasing operation to be shorter than an end of the first voltage increasing and decreasing operation so as to inhibit the output voltage from overshooting.

2. The DC-DC converter according to claim 1, wherein:
when the output voltage is lower than a target voltage having the constant voltage level in the voltage increasing operation, the control unit gradually increases the on-state time in the voltage increasing switch so as to increase the input voltage.

3. The DC-DC converter according to claim 1, wherein:
when the output voltage is lower than a target voltage having the constant voltage level in the first voltage increasing and decreasing operation, the control unit gradually increases the on-state time in the voltage increasing switch so as to increase the input voltage.

4. The DC-DC converter according to claim 3, wherein:
in the first voltage increasing and decreasing operation, the control unit fixes the off-state time in the voltage decreasing switch at a predetermined minimum value.

5. The DC-DC converter according to claim 1, wherein:
when the output voltage is higher than a target voltage having the constant voltage level in the second voltage increasing and decreasing operation, the control unit gradually increases the off-state time in the voltage decreasing switch so as to decrease the input voltage.

6. The DC-DC converter according to claim 5, wherein:
in the second voltage increasing and decreasing operation, the control unit fixes the on-state time in the voltage increasing switch at a predetermined minimum value.

7. The DC-DC converter according to claim 1, wherein:
when the output voltage is higher than a target voltage having the constant voltage level in the voltage decreasing operation, the control unit gradually increases the off-state time in the voltage decreasing switch so as to decrease the input voltage.

* * * * *